United States Patent

[11] 3,619,765

[72] Inventor Peter Wood
 Pittsburgh, Pa.
[21] Appl. No. 49,318
[22] Filed June 24, 1970
[45] Patented Nov. 9, 1971
[73] Assignee Westinghouse Electric Corporation
 Pittsburgh, Pa.

[54] ELECTRICAL CONTROL APPARATUS USING DIRECTION OF CURRENT AND POWER FLOW TO GATE SWITCHING DEVICES
19 Claims, 11 Drawing Figs.

[52] U.S. Cl. .................................................. 323/43.5 S
[51] Int. Cl. .................................................. G05f 1/20
[50] Field of Search .......................................... 323/22 SC,
 24, 43.5 S, 47

[56] References Cited
UNITED STATES PATENTS

| | | | |
|---|---|---|---|
| 3,340,462 | 9/1967 | Ebersohl ........................ | 323/43.5 S |
| 3,375,437 | 3/1968 | Mellott et al. .................. | 323/43.5 S |
| 3,466,530 | 9/1969 | Matzl .............................. | 323/43.5 S |

Primary Examiner—A. D. Pellinen
Attorneys—A. T. Stratton, F. E. Browder and D. R. Lackey ABSTRACT: Electrical control apparatus including a transformer having a winding connectable in a power circuit which includes a source of alternating potential and a load circuit. The transformer winding includes at least two tap connections which are selectively connected into the power circuit with solid-state switching devices. The solid-state switching devices are gated at a firing angle responsive to an error signal. Tap-to-tap short circuits are obviated, regardless of the type of connected load, by firing control which senses the direction of instantaneous power flow, and the direction of instantaneous current flow in the power circuit.

3,619,765

ELECTRICAL CONTROL APPARATUS USING DIRECTION OF CURRENT AND POWER FLOW TO GATE SWITCHING DEVICES

BACKGROUND OF THE INVENTION

1. Field of the Invention

The invention relates in general to electrical control apparatus, and more specifically to regulator apparatus of the solid-state tap changing type for alternating potential systems.

2. Description of the Prior Art

U.S. Pat. No. 3,040,239, which is assigned to the same assignee as the present application, discloses regulator apparatus for alternating potential systems which changes taps on a transformer winding, via solid-state switching devices, during each half cycle of the alternating potential. The firing angle at which the taps are statically changed during a half cycle depends upon the magnitude of an error signal, which in turn is responsive to a manually set control, or a feedback signal from a circuit parameter to be regulated. The practical simplicity of this arrangement has made it attractive to attempt to use the regulator in power regulating circuits, but lack of suitable means which will maintain control of the circuit under all types of loads, has limited its application. Control time available in each half cycle of the source potential, using conventional firing control circuits, is limited by the phase angle of the load. For example 90° of each half cycle is lost when the load is purely capacitive or purely inductive. Thus, it would be desirable to provide new and improved regulator apparatus of the solid-state tap changing type, which will maintain full control with any type of connected load.

SUMMARY OF THE INVENTION

Briefly, the present invention is new and improved regulator apparatus for alternating current systems, which maintains full control for substantially a complete cycle, for load power factors which may vary from zero lead to zero lag. The regulator apparatus includes a transformer having a winding connected between a source of alternating potential and a load circuit, via at least two taps, each of which are connected into the electrical power circuit via solid-state switching devices connected in inverse parallel. Firing control switches the solid-state switching devices at a firing angle in each half cycle of the source potential in response to an error signal, with tap-to-tap short circuits being prevented, regardless of the load power factor. Tap-to-tap short circuits are precluded by means which senses the direction of instantaneous power flow in the power circuit, and means which senses the direction of instantaneous current flow in the power circuit. When the direction of instantaneous power flow is from the source of alternating potential to the load circuit, the firing control will only allow a tap change which increases the load voltage, with the direction of instantaneous current flow being used to gate the proper switching device associated with the selected higher voltage tap. When the instantaneous power flow is from the load circuit to the source of alternating potential, the firing control will only allow a tap change which decreases the load voltage, with the direction of instantaneous current flow being used to gate the proper switching device associated with the lower voltage tap. Limitations of the solid-state switching devices themselves, i.e., time to reach holding current on switching "on," and time to turn "off," are the only limitations on the control range of the regulator apparatus. With a 60 Hz. power system guard bands are provided by the disclosed apparatus which prevent tap changes within plus or minus 25 microseconds of the voltage and current zero crossings, thus providing control for 178° of each 180° half cycle, regardless of the load power factor.

BRIEF DESCRIPTION OF THE DRAWING

The invention may be more readily understood when considered in view of the following detailed description of exemplary embodiments thereof, taken in connection with the accompanying drawings, in which.

DESCRIPTION OF PREFERRED EMBODIMENTS

Figure 1:
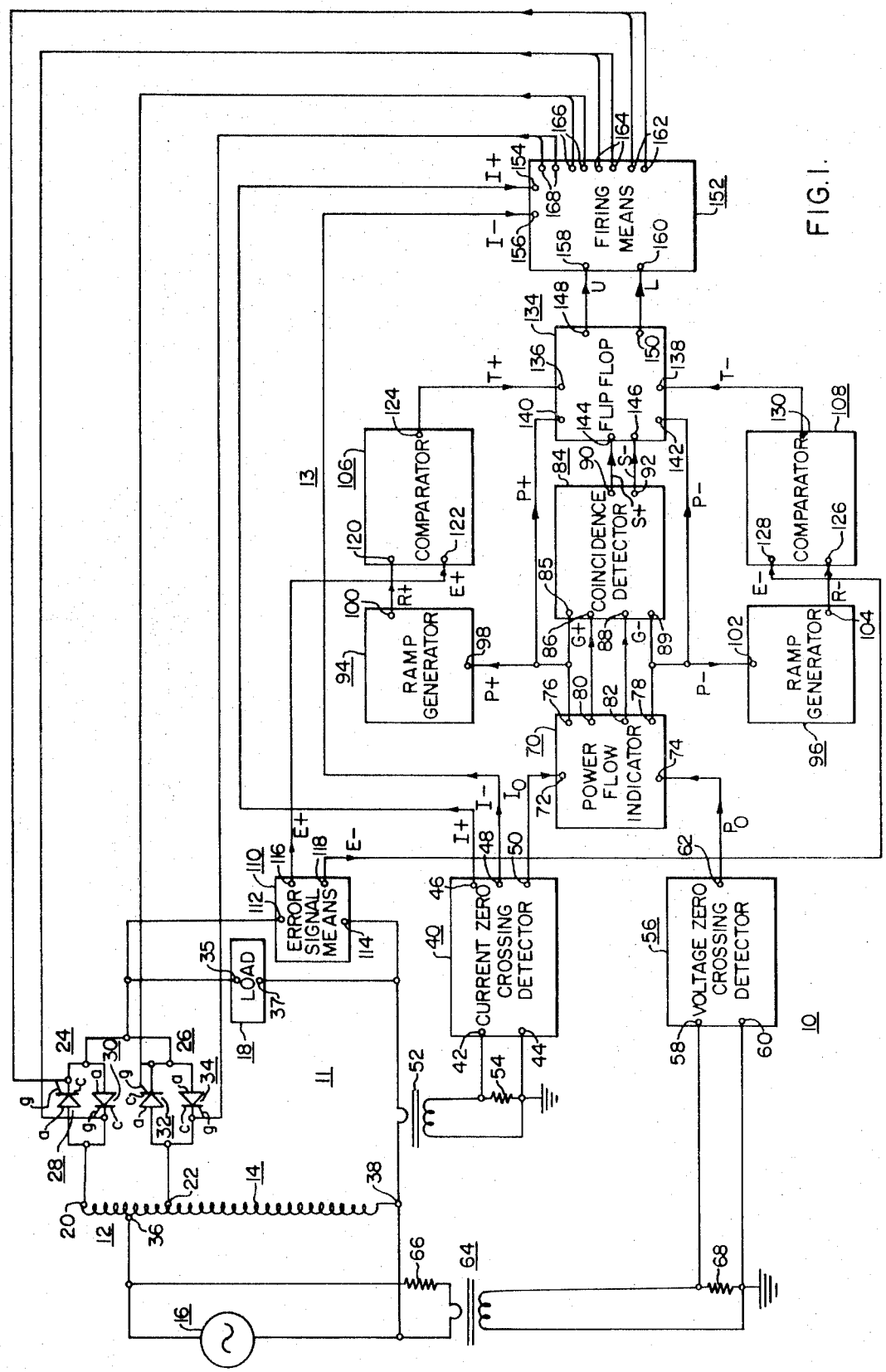
FIG. 1 is a block diagram of regulator apparatus constructed according to the teachings of a first embodiment of the invention.

Referring now to the drawings, and FIG. 1 in particular, there is shown a block diagram of regulator apparatus 10 constructed according to a first embodiment of the invention. Regulator apparatus 10 comprises a basic power circuit 11 and control 13 for controlling the power circuit. The basic power circuit 11 of the regulator apparatus 10 includes transformer means 12 having an electrical winding 14 connected between the source 16 of alternating potential and a load circuit 18, via at least first and second tap connections 20 and 22, respectively. The invention applies to a transformer having two or more tap connections, but will be described with a transformer having two tap connections for purposes of simplicity. It will be obvious from the following detailed description how the invention may be applied to a transformer having more than two tap connections.

Transformer means 12 may be of the isolated winding type, having a primary winding connected to the source 16 and a secondary winding connected to the load circuit 18; or, as illustrated in FIG. 1, transformer 12 may be of the autotransformer type. Tap connection 20 is a higher voltage tap than tap connection 22, and each are connected to the load circuit via first and second bilateral AC switching means 24 and 26, respectively. While the invention will be described with the tap connections connected to the load circuit, it will also be suitable to regulate the load voltage by connecting the transformer tap connections to the source 16 of alternating potential.

The first bilateral AC switching means 24 includes first and second solid-state switching means 28 and 30, respectively, connected in inverse parallel, and the second bilateral AC switching means 26 includes first and second solid-state switching means 32 and 34, respectively, which are also connected in inverse parallel. The solid-state switching means 28, 30, 32 and 34 may be silicon-controlled rectifier devices, each having anode, cathode and gate electrodes $a$, $c$, and $g$, respectively. The anode and cathode electrodes $a$ and $c$ of controlled rectifiers 28 and 30 are connected to tap connection 20, the anode and cathode electrodes *a* and *c* of controlled rectifiers 32 and 34 are connected to tap connection 22, and the remaining anode and cathode electrodes of the switching devices are connected to terminal 35 of the load circuit 18.

The source 16 of alternating potential is connected to terminals 36 and 38 of transformer winding 14, and terminal 38 is connected to terminal 37 of the load 37 of the load circuit 18. The location of terminal 36 on winding 14 depends upon whether the tap changer apparatus is designed to buck the source potential, boost the source potential, or to both buck and boost the source potential. As illustrated in FIG. 1, terminal 36 is located between tap connections 20 and 22, with the voltage applied to the load circuit being higher than the source potential when tap connection 20 is effectively connected to the load circuit 18, and lower than the magnitude of the source potential when tap connection 22 is effectively connected to the load circuit 18.

Controlled rectifiers 28 and 32 are poled to conduct current from the source 16 to the load circuit 18, and controlled rectifiers 30 and 34 are poled to conduct current from the load circuit 18 to the source 16 of alternating potential. Therefore, oppositely poled controlled rectifiers should never be conductive at the same time on taps 20 and 22, as a tap-to-tap short circuit would be created. This limitation has resulted in limited application of power circuit 11 in the prior art, especially when the power factor of the load circuit 18 may vary widely. The present invention discloses control apparatus 13 which enables the power circuit 11 to be used with any type of load, i.e., resistive, regenerative, inductive (lagging) or capacitive (leading), while maintaining complete control and precluding tap-to-tap short circuits.

Broadly, the control 13 provides the desired results by sensing the direction of instantaneous power flow in the power circuit 11, and also the direction of instantaneous current flow in the power circuit 11. When the power flow is from the load circuit 18, which will be referred to hereinafter as positive power flow, it is safe to execute a tap change which increases the load voltage. When the power flow is from the load circuit 18 to the source 16, which will hereinafter be referred to as negative power flow, it is safe to execute a tap change which reduces the load voltage. Accordingly, control 13 is arranged to allow load voltage increasing tap changes only when the power flow is positive, and to allow load voltage decreasing tap changes only when the power flow is negative, regardless of the load power factor. The direction of instantaneous power flow thus selects the tap which may be switched "on" at any time. Then, by using the direction of instantaneous current flow, the controlled rectifier of the selected tap that will carry the existing load current at the time a tap change is ordered, may be selected. When an error signal demands a tap change, the firing circuit will have the information relative to the direction of instantaneous power and current flow, and can thus gate the proper controlled rectifier.

While theoretical control time, using control 13, is a full 180° of each half cycle, a practical tap-changing system must set a finite limit on the minimum time between successive tap changes because of intertap reactance and device recovery time. Thus, control 13 is arranged to prevent switching taps for about plus or minus 25 microseconds about the voltage and current zero crossings, resulting in effective control for about 178° of each half cycle of the source potential for a 60 Hz. power system.

Control 13 includes means 40 having input terminals 42 and 44 and output terminals 46, 48 and 50, which provides signals responsive to the zero crossings of the load current, the direction of the zero crossing, and provides signals responsive to the positive and negative durations of the load current alternations. The load current may be sensed by current transformer 52, with a voltage responsive to the current flowing through the primary winding of the current transformer 52 being developed across resistor 54 and applied to the input terminals 42 and 44 of means 40. Means 40 provides first and second current responsive signals I+ and I− responsive to the duration of the positive and negative alternations of the load current at its output terminals 46 and 48, respectively, and a signal $I_0$ which provides information concerning the time and duration of the load current zero crossings.

Control 13 includes means 56 having input terminals 58 and 60 and an output terminal 62, which provides output signals $P_0$ responsive to the zero crossings of the source 16 of alternating potential, and the direction of the zero crossings. The voltage of source 16 may be sensed by connecting the primary winding of a current transformer 64 and a resistor 66 across the source 16, and developing a voltage responsive to the source voltage across resistor 68, which is applied to the input terminals 58 and 60 of means 56.

Signals $I_0$ and $P_0$ which provide information relative to the current and voltage zero crossings of the load current and source potential, respectively, are applied to means 70 which provides signals relative to the direction of instantaneous power flow in the power circuit 11. Means 70 has input terminals 72 and 74 connected to output terminals 50 and 62, respectively, of means 40 and 56, and output terminals 76, 78, 80 and 82. Means 70 provides an output or first power flow signal P+ at terminal 76 when the direction of the instantaneous power flow in circuit 11 is positive, and an output or second power flow signal P− at terminal 78 when the direction of instantaneous power flow is negative. However, due to the switching time limitations of the controlled rectifier devices, and the commutation times due to intertap reactance, it is not desirable to switch taps on winding 14 at a voltage or current zero crossing. This function of preventing tap changes at these particular times is provided by spacing the P+ and P− signals by about 50 microseconds in a 60 Hz. system. This space or time between signals P+ and P− will be referred to as guard bands, as they prevent, or guard against, switching taps when a short circuit could be experienced between tap connections. Thus, means 70 will always provide a signal P+ or P−, except during the guard bands. These guard bands are also used to accommodate resistive and regenerative loads when the positive and negative flow periods tend toward zero time, respectively. Purely resistive and purely regenerative loads are detected by generating signals during the guard bands, with a first zero crossing signal G+ being provided at output terminal 80 when the load current goes through zero, and a second zero crossing signal G− being provided at output terminal 82 when the source voltage goes through zero. Signals G+ and G− are applied to means 84, which is a coincidence detector, having input terminals 85, 86, 88 and 89 connected to terminals 76, 80, 82 and 78 respectively, of means 70, and output terminals 90 and 92. Output terminal 90 provides a first coincident signal S+ when the signals G+ and G− coincide due to a purely resistive load, the latter being sensed at terminal 85, and output terminal 92 provides a second coincident signal S− when the signals G+ and G− coincide due to a regenerative load, with the latter being sensed at terminal 89. The functions of signals S+ and S− will be hereinafter explained.

Signals P+ and P− are applied to means 94 and 96 respectively, which means are ramp generators providing ramp voltages in response to signals P+ and P−. Ramp generator 94 has input terminal 98 connected to output terminal 76 of means 70, and an output terminal 100 which provides a first ramp voltage signal R+ in response to signal P+. Signal R+ is initiated by the start of signal P+, with signal R+ having a predetermined magnitude when it is initiated, and signal R+ increases at a predetermined linear rate terminating when signal P+ terminates.

Ramp generator 96 has an input terminal 102 connected to output terminal 78 of means 70, and an output terminal 104 which provides a second ramp voltage signal R− in response to signal P−. Signal R+ is initiated by the start of signal P−, when signal R− starting at a predetermined magnitude and increasing at a predetermined linear rate, terminating when signal P− terminates. Therefore, signals R+ and R− are spaced apart in time by the same period as signals P+ and P−, preserving the guard bands. The ramp voltages R+ and R− are similar to those used in many phase-controlled firing circuits, except, by design, the voltages R+ and R− are maintained at constant and equal peak amplitudes, irrespective of their relative time durations.

The ramp voltages R+ and R− compared with control or error signals in means 106 and 108, respectively, and when the ramp voltage magnitude reaches the magnitude of the error signal, a trigger signal is generated which signifies that a tap change is required. The control or error signals may be provided by a manually set control, or by a closed loop feedback system as illustrated in FIG. 1. In FIG. 1 error signal means 110 is disposed to sense a circuit parameter which is to be regulated, such as the load voltage, and provide error signals in response to this parameter. For purposes of example, error signal means 110 has input terminals 112 and 114 connected to terminals 35 and 37, respectively, of the load circuit 18, and output terminals 116 and 118 which provide first and second error signals E+ and E−, respectively. The error signals E+ and E− are set to be equal to one another when they are at a magnitude which equals the midpoint of the ramp voltages E+ and E−, and to shift in potential equally in opposite directions as the output quantity used as a feedback control changes. When error signal E+ is equal to error signal E−, and then the feedback signal increases, signal E− will decrease while signal E+ will increase, and when the feedback signal decreases, signal E− will increase and signal E+ will decrease.

Means 106 has input terminals 120 and 122 which receive signals R+ and E+ respectively, and an output terminal 124. Input terminal 120 is connected to terminal 100 of ramp generator 94, and input terminal 122 is connected to terminal 116 of error signal means 110. Output terminal 124 provides a first trigger signal T+ when the ramp voltage R+ reaches the magnitude of the error signal E+.

Means 108 has input terminals 126 and 128 which receive signals R− and E−, respectively, and an output terminal 130. Input terminal 126 is connected to terminal 104 of ramp generator 96, and input terminal 128 is connected to terminal 118 of error signal means 110. Output terminal 130 provides a second trigger signal T− when the ramp voltage R− reaches the magnitude of the error signal E−.

The trigger signals T+ and T− are applied to means 134, such as a flip-flop circuit, which has input terminals 136, 138, 140, 142, 144 and 146, and output terminals 148 and 150. The flip-flop means 134 provides an output at either terminal 148 or terminal 150, depending upon the direction of instantaneous power flow in circuit 11. Trigger signals T+ and T− are applied to input terminals 136 and 138, respectively, from terminals 124 and 130, respectively, of means 106 and 108. When signal T+ is generated by ramp voltage signal R+ crossing error signal E+, indicating the power flow is positive, a tap change may be initiated in the load voltage increasing direction, causing flip-flop means 134 to provide a first output signal U at terminal 148. The generation of output signal U is a signal to change to a higher voltage tap. THus, the initiation of signal U selects the tap which is to have one of its switching devices activated, which tap is the next higher voltage tap compared to the tap on which the tap changer is then operating.

When T− is generated by ramp voltage signal R− crossing the error signal E−, indicating the power flow is negative, a tap change may be initiated in the load voltage decreasing direction, causing flip-flop means 134 to provide a second output signal L at its output terminal 150. The generation of output signal L is a signal to change to a lower voltage tap. Thus, the initiation of signal L selects the tap which is to have one of its switching devices activated, which is the next lower voltage tap adjacent the tap on which the system is then operating.

In the event signals T+ or T− are not generated, due to the failure of signals E+ and R+, or signals E− and R−, to intersect, respectively, it would be desirable, though not absolutely essential, to have the regulator go through the motions of a tap change, even when the manual or feedback control signal calls for continuous upper or lower tap operation. This will minimize the desaturation time of the regulator, and make it easier to stabilize closed loop control systems. As illustrated in FIG. 1, this result is accomplished by changing the state of flip-flop means 134 at the termination of signals P+ and P−, when the flip-flop 134 did not receive signals T+ or T−. Flip-flop means 134 is responsive to signals P+ and P− at its input terminals 140 and 142, respectively, with input terminal 140 being connected to output terminal 76 of power flow indicator 70, and input terminal 142 being connected to output terminal 78 of power flow indicator 70. Therefore, when signals R+ and E+ do not intersect, due to the magnitude of signal E+ being greater than the maximum magnitude of signal R+ the termination of signal P+ causes flip-flop means 134 to change state and initiate signal U. When E+ is too large to intersect signal R+, signal E− will be of a very small magnitude, immediately intersecting signal R−, which switches back to the lower tap as soon as signal R− is initiated. Thus, while a tap change is made, it remains on the newly selected tap for only the duration of a guard band.

When signals R− and E− do not intersect, due to signal E− being greater than the maximum magnitude of signal R−, the termination of signal P− causes flip-flop means 134 to change state and initiate signal L. In this instance, signal E+ will be of a small magnitude, thus switching back to the higher voltage tap as soon as signal R+ is initiated.

Firing means 152 provides firing signals for the appropriate controlled rectifier device, in response to signals U, L, I+ and I−. Firing means 152 has input terminals 154, 156, 158 and 160, and output terminal 162, 164, 166 and 168. Input terminals 154 and 156 are connected to terminals 46 and 48, respectively, of means 40, receiving signals I+ and I−, respectively, indicative of the instantaneous direction of load current flow, and input terminals 158 and 160 are connected to output terminals 148 and 150 of flip-flop means 134, receiving signals U and L, respectively.

Since firing means 152 either receives signal U or signal L, and either signal I+ or I−, it can easily select the required control rectifier to be fired. For example, if flip-flop 134 switches to provide an output signal U at output terminal 148, this automatically selects the higher voltage tap 20, and if firing means 152 is receiving signal I+, indicating current flow toward the load, firing means 152 will provide an output signal at terminal 162 and gate controlled rectifier 28. Controlled rectifier 32 of the lower voltage tap would be conductive at the time of the tap change, and thus device 32 will be commutated off. If flip-flop 134 switches to provide an output signal U at output terminal 148, this selects the higher voltage top 20, and the firing means 152 is receiving signal I− indicating the direction of current flow is toward the source, firing means 152 will provide an output signal at terminal 164 and gate-controlled rectifier 30. Controlled rectifier 34 of the lower voltage tap would be conductive at the time of this tap change, and thus device 34 would be commutated off.

If flip-flop 134 switches to provide output signal L at output terminal 150, this selects the lower voltage tap 22. If firing means 152 is receiving signal I+, a signal will be provided at output terminal 166 to gate switching device 32. If firing means 152 is receiving signal I−, a signal will be provided at output terminal 168, gating switching device 34.

Since flip-flop 134 can only change its operating state during or at the end of signals P+ and P−, tap changes cannot occur during the guard bands when tap-to-tap short circuits could occur. Thus, the proper switching device of a proper tap is automatically selected by control circuit 13, regardless of the load power factor, and complete control is maintained throughout each half cycle, except for the short periods of the guard bands which remove only about 2° from the 180° available control range per half cycle of the source voltage. When the load current passes through current zero while the tap changer apparatus is operating on a predetermined tap, the proper device of that tap is automatically gated by the control apparatus as the current reversal is made, to continue operating on the desired tap.

When the load circuit approaches the purely resistive state, signal P− will not be produced, and when the load circuit approaches the purely regenerative state signal P+ will not be produced. Under these conditions the control would "freeze" on the upper or lower tap, respectively, unless auxiliary means is provided for switching taps. This auxiliary means is provided by signals G+ and G− and the coincidence detector 84, hereinbefore described. When the load becomes purely resistive, signals G+ and G− coincide, and signal S+ is generated at output terminal 90 of the coincidence detector 84, which signal is applied to input terminal 144 of the flip-flop means 134. When signal S+ is generated, it switches the state of flip-flop means 134, causing it to generate signal L and switch to the lower voltage tap at the voltage zero crossings. When the load becomes purely regenerative, signals G+ and G− also coincide, and signal S− is generated at output terminal 92 of the coincidence detector 84, which signal is applied to input terminal 146 of flip-flop means 134. When signal S− is generated, it switches the state of flip-flop means 134, causing it to generate signal U and switch to a higher voltage tap at the voltage zero crossings.

The operation of regulator apparatus 10 may be better understood by considering the four types of loads, i.e., lagging, leading, resistive and regenerative, separately, with FIGS. 2, 3, 4 and 5 illustrating sets of circuit waveforms for these loads, respectively.

Figure 2:
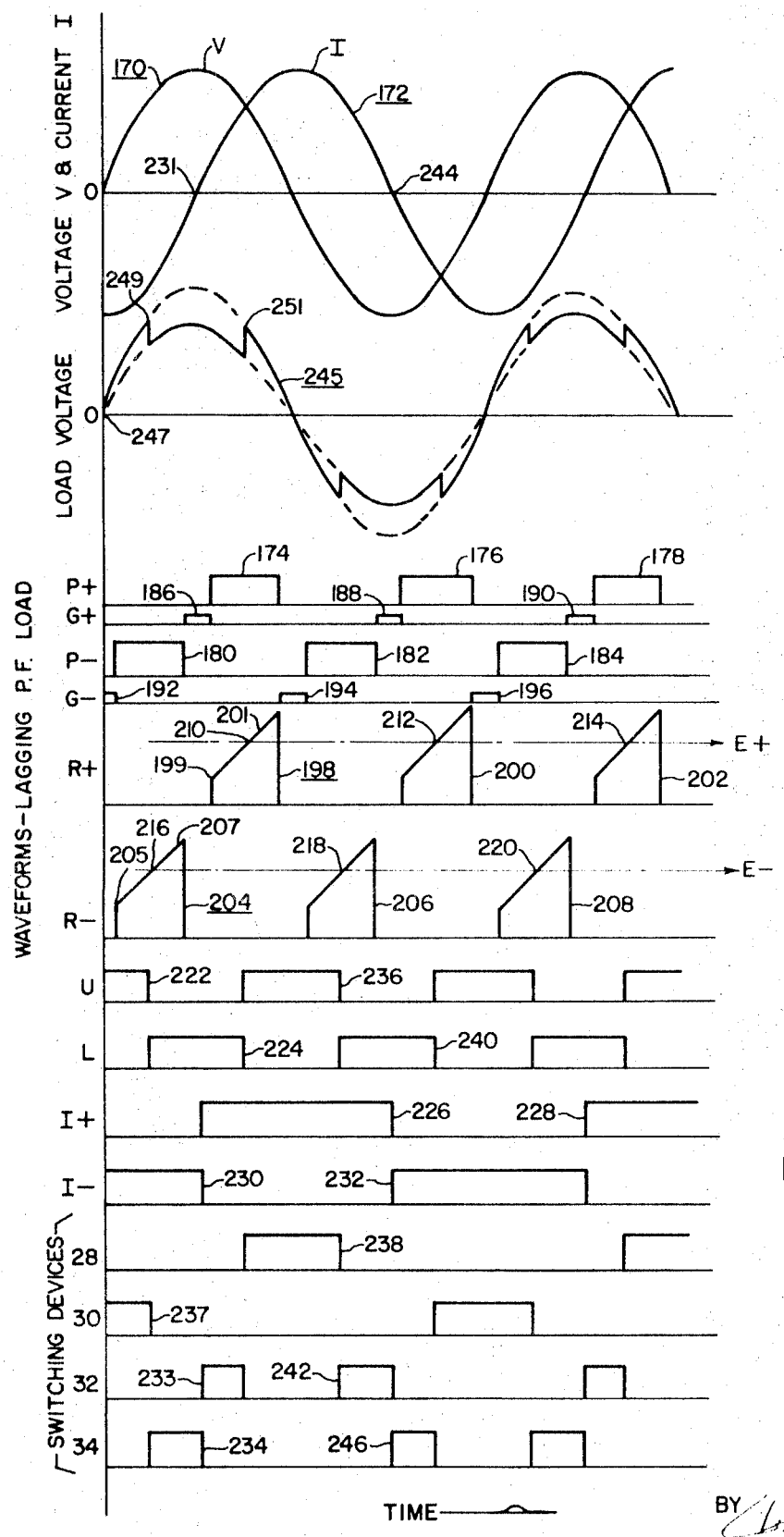
FIG. 2 is a set of waveforms which illustrate the operation of the regulator apparatus shown in FIG. 1 with an inductive load.

More specifically, FIG. 2 illustrates the circuit waveforms explanatory of the operation of regulator apparatus 10 shown in FIG. 1 for a lagging load. The source voltage is illustrated by waveform 170, and the lagging current is illustrated by waveform 172. The current and voltage zero crossings are sensed and processed to provide signals P+, during positive power flow, and signals P− during negative power flow conditions. Signals P+ are indicated by waveforms 174, 176 and 178, and signals P− are indicated by signals 180, 182 and 184. It will be noted that signals P− and P+ are spaced in time by a small increment at the voltage and zero crossings, providing the required guard bands, with signals G+ being generated in the guard bands at the current zero crossings and signals G− being generated in the guard bands at the voltage zero crossings. Signals G+ are represented by waveforms 186, 188 and 190, and signals G− are represented by waveforms 192, 194 and 196. It will be noted that with a lagging load, signals G+ and G− are not coincident. Thus, the first and second coincident signals S+ and S− are not generated with this type of load.

Ramp generator 94 provides signals R+ in response to signal P+, with the R+ waveforms 198, 200 and 202 being generated in response to the P+ waveforms 174, 176 and 178, respectively. It will be noted that the R+ signals start and stop with the P+ signals, preserving the guard bands, and that the R+ signals start at a predetermined elevated pedestal, such as the magnitude indicated at point 199 in waveform 198, with the ramp increasing from the pedestal at a linear rate along line 201.

Ramp generator 96 provides signals R− in response to signals P−, with the R− waveforms 204, 206 and 208 being generated in response to the P− waveforms 180, 182 and 184, respectively. It will be noted that the R− signals start and stop with the P− signals, preserving the guard bands, and that the R− signals start at a predetermined elevated pedestal, such as illustrated at point 205 in waveform 204, and it increases at a linear rate along line 207.

The magnitude of the error signal voltages E+ and E− are imposed across the R+ and R− signals, respectively, with signal E+ intersecting the ramp voltage waveforms 198, 200 and 202 at points 210, 212 and 214, respectively, Signal E− intersects the ramp voltage waveforms 204, 206 and 208 at points 216, 218 and 220, respectively.

When signal E− intersects the R− waveform 204 at point 216, trigger signal T− is generated which changes the operating state of flip-flop means 134, terminating the output signal U, indicated by waveform 222 and initiating output signal L, indicated by waveform 224. This action selects the switching devices associated with the lower voltage tap 22. Signals I− and I+ determine which device of the selected tap should be gated, with signals I+ corresponding to the positive alternations of the load current 172, which signals are indicated by waveforms 226 and 228. Signals I− correspond to the negative alternations of the load current 172, with the signals being indicated by waveforms 230 and 232. Thus, when signal L is generated at waveform 224, it gates switching device 34 of the lower tap, indicated by waveform 234. Device 30 of the upper tap was conducting at the start of the tap change, indicated by waveform 237, and is commutated off by the gating of device 34 during this condition of negative power flow.

When the load current goes through zero in the positive direction at point 231, the oppositely poled device of the same tap is gated by the initiation of signal I+, indicated by waveform 226. In other words, device 32 is gated on, indicated by waveform 233, and device 34 of the same tap connection is commutated off.

Regulator apparatus 10 remains operating on tap 22 until ramp voltage signal R+, represented by waveform 198 crosses the error signal E− at point 210. At this point signal U, represented by waveform 236 is generated, and since signal I+ is still being received by firing 152, device 28 of the upper tap is gated, indicated by waveform 238, which commutates switching device 32 off, during this condition of positive power flow. Device 28 remains conductive until the R− ramp voltage 206 intersects error signal E− at point 218, which generates signal L, indicated by waveform 240. Signal L selects the lower voltage tap, and since the load current is still positive, indicated by the signal I+ waveform 226, device 32 is gated, indicated by waveform 242, which commutates device 28 to its nonconductive state. When load current reversal occurs at point 244, signal I−, indicated by waveform 232, gates the device 34 of the same tap, indicated by waveform 246, commutating device 32 to its nonconducting state. Thus, it will be noted that taps are changed by gating a device poled in the same direction as the conductive device of the other tap, and when current reversal occurs, the devices of the conductive tap switch, which arrangement prevents tap-to-tap short circuits. The effect of the tap changes on the load voltage may be observed by examining the load voltage waveform 245. The load voltage starts at zero at point 247 and follows the voltage of the higher voltage tap until reaching point 249, at which point a tap change is made, and the load voltage drops to the voltage of the lower voltage tap. It follows the voltage of the lower voltage tap until reaching point 251, at which point a tap change is made, and the load voltage increases to the voltage of the higher voltage tap.

If the magnitude of the error signal E+ increases and E− decreases, indicating that the parameter being regulated, such as the load voltage, should be decreased, the tap change to the lower voltage tap will be made earlier in the load voltage half cycle, and the tap change back to the higher voltage tap will be made later in the load voltage half cycle, reducing the effective magnitude of the load voltage. If the magnitude of error signal E+ decreases and E− increases, indicating that the parameter being regulated should be increased, the tap change to the lower voltage tap will be made later in the load voltage half cycle, and the tap change back to the higher voltage tap will be made earlier in the load voltage half cycle, increasing the effective magnitude of the load voltage.

If the error signal magnitude E− should be so high that it does not intersect the ramp voltage signals R−, a tap change would be made at the end of the P− signal, and since the error signal E+ will be a low magnitude, it would intersect the R+ signal as it is initiated, immediately switching back to the higher voltage tap. If the magnitude of the error signal E+ should be so great that it does not intersect the ramp voltage R+, the regulator would operate on the low voltage tap except during the guard bands, switching to the higher voltage tap at the end of the P+ signal, and immediately switching back to the low tap at the start of the R− signal.

Figure 3:
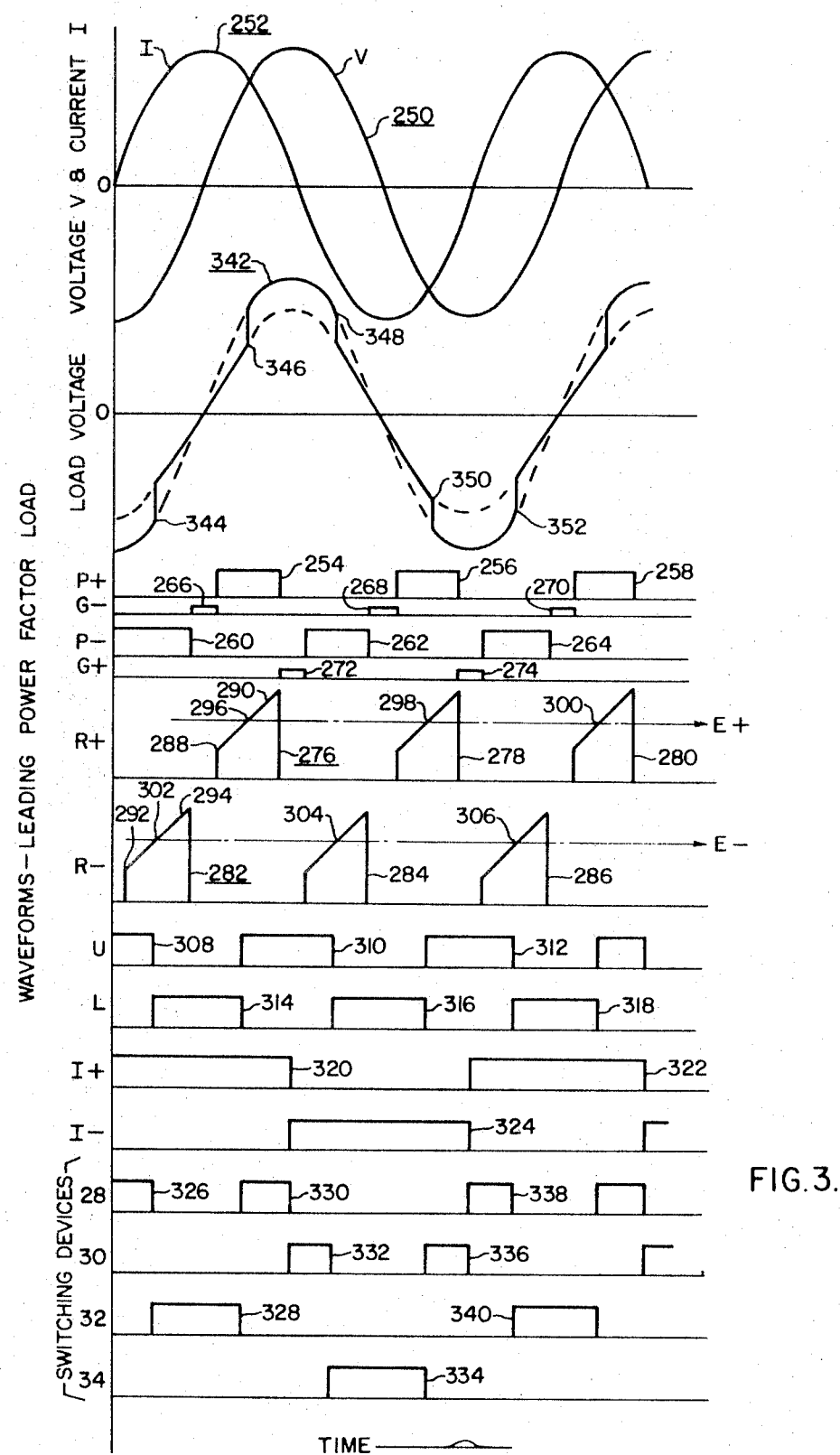
FIG. 3 is a set of waveforms which illustrates the operation of the regulator apparatus shown in FIG. 1 with a capacitive load.

FIG. 3 illustrates the circuit waveforms explanatory of the operation of regulator apparatus 10 with a leading load. The source voltage is illustrated by waveform 250, and the leading current by waveform 252. The current and voltage zero crossings are sensed and processed to provide P+ signals 254, 256 and 258, and P− signals 260, 262 and 264. The G+ signals are generated in the guard bands at the current zero crossings, represented by waveforms 272 and 274, and the G− signals are generated in the guard bands at the voltage zero crossings, and they are represented by waveforms 266, 268 and 270. As illustrated in FIG. 3, the G+ and G− signals are not coincident, and thus signals S+ and S− are not generated with a leading load.

R+ signals 276, 278 and 280 are generated in response to the P+ signals 254, 256 and 258, respectively, and the R− signals 282, 284 and 286 are generated in response to the P− signals 260, 262 and 264. As illustrated the R+ signals start at a predetermined pedestal, such as point 288 in waveform 276, and they increase linearly, such as along line 290 in waveform 276. In like manner, the R− signals start at a predetermined pedestal, such as point 292 in waveform 282, and the R− voltages increase at a linear rate, such as along line 294.

The E+ and E− signals are superimposed on the R+ and R− signals, respectively, with the E+ signals intersecting the R+ signals 276, 278 and 280 at points 296, 298 and 300, respectively. The E− signal intersects the R− signals 282, 284 and 286 at points 302, 304 and 306. When the E− signal intersects the R− waveform 282 at point 302, signal U is terminated and signal L in initiated, with these signals being represented by waveforms 308 and 314, respectively. At the time of this change the I+ signal 320 is being generated, which selects switching device 32, illustrated by waveform 328, commutating device 28, represented by waveform 326, to its nonconductive state. When signal E+ crosses the R+ signal 276 at point 296, the L signal 314 is terminated and the U signal 310 is initiated, gating device 28 of the higher voltage tap, indicated by waveform 330, and commutating device 32, represented by waveform 328. At current reversal, the I+ signal 320 terminates and the I− signal 324 is initiated, which gates device 30 of the upper tap, commutating device 28 of the upper tap. The gating of device 30 is indicated by waveform 332. When the error signal E− intersects the R− waveform 284 at point 304, the U signal 310 is terminated and the L signal 316 is initiated, gating device 34, indicated by waveform 334 and commutating device 30, indicated by waveform 332. When signal E+ crosses the R+ waveform 278 at point 298, device 30 of the upper tap is gated, indicated by waveform 336, commutating device 34 of the lower tap to its nonconductive state. Current reversal terminates signal I− and initiates the I+ waveform 322, gating device 28, represented by waveform 338, and commutating device 30, indicated by waveform 336. The E− crossing of the R− waveform 286 at point 306 gates device 32 and commutates device 28, with the gating of device 32 being indicated by waveform 340.

The effect of the tap changes on the load voltage may be observed by examining the load voltage waveform 342. The load voltage waveform is operating on the higher voltage tap at time zero, switching to the lower voltage tap at 344 and continuing on the lower voltage tap until reaching point 346, where it again switches to the higher voltage tap. It operates on this higher voltage tap until reaching point 348, where it again switches to the lower voltage tap and operates on this tap until reaching point 350, where it again switches to the higher voltage tap. At point 352 it switches to the voltage of the lower voltage tap and continues to operate on the lower voltage tap through voltage zero. The changing magnitudes of the error signals E+ and E− operate to achieve the desired effective load voltage, as hereinbefore described relative to the lagging load, illustrated by the waveforms in FIG. 2. The regulator circuit also goes through the motions of making a tap change even when the error signal is calling for continuous upper or lower tap operation, as hereinbefore described relative to the operation of the circuit with lagging load.

Figure 4:
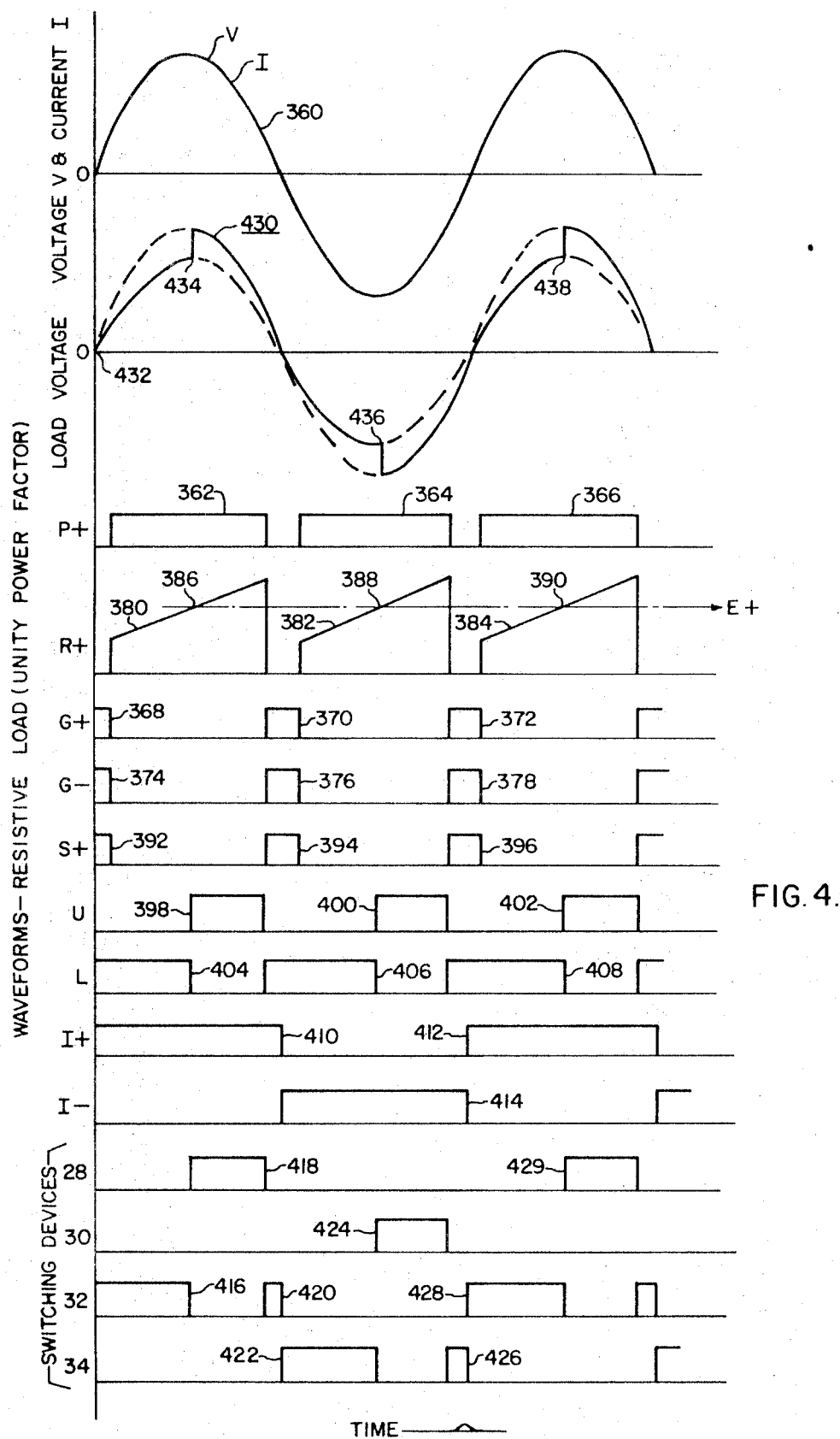
FIG. 4 is a set of waveforms which illustrates the operation of the regulator apparatus shown in FIG. 1 with a resistive load.

FIG. 4 illustrates the circuit waveforms explanatory of the operation of regulator apparatus 10 shown in FIG. 1, for a resistive load. With a resistive load, the source voltage and load current are in phase and they are represented by waveform 360. With a resistive load, the power flow is always positive, represented by the P+ signals 362, 264 and 366, and P− signals are not produced. The R+ signals 380, 382 and 384 are provided in response to the P+ signals 362, 364 and 366, respectively. The G+ signals, generated in the guard bands at the current zero crossings are represented by waveforms 368, 370 and 372, and the G− signals, generated in the guard bands at the voltage zero crossings, are represented by waveforms 374, 376 and 378. Since the G+ and G− signals are coincident, and the load is resistive, S+ signals 392, 394 and 396 are generated at each point of coincidence. The error signal E+ is superimposed on the R+ signals, intersecting waveforms 380, 382 and 384 at points 386, 388 and 390, respectively. When error signal E+ intersects R+ waveform 380 at point 386, the L signal 404 is terminated, and a U signal 398 is initiated, gating device 28, as illustrated by waveform 418, and commutating device 32 to its nonconductive state, illustrated by waveform 416. Thus, as illustrated on the load voltage waveform 430, the static tap changer operates on the lower tap until E+ crosses R+ at point 386, increasing the load voltage at point 434 to that of the higher voltage tap. Signal S+, represented by waveform 394, initiates the L signal waveform 406, gating device 32, illustrated by waveform 420 for a very short period of time during current reversal, and then immediately gating device 34 of the lower voltage tap, represented by waveform 422. This operation is essential, as the switch from the higher to the lower voltage tap is made through devices poled in the same direction, preventing the possibility of tap-to-tap short circuits. The static tap changer then operates on the lower voltage tap from the current/voltage zero point until reaching point 436 on the load voltage waveform, at which time the E+ signal crosses the R+ signal 382 at point 388, terminating the L signal 406 and initiating the U signal 400, applying a gating signal to device 30, indicated by waveform 424, and commutating device 34, represented by waveform 422. As current zero is again approached, the S+ signal waveform 396 gates device 34, represented by waveform 426, as the current is going through zero, and then immediately gates device 32 of the same tap, represented by waveform 428. The load voltage then starts its positive alternation from zero on the lower voltage tap, until reaching the E+ crossing of R+ waveform 384 at point 390, increasing the load voltage at point 438 to the higher voltage tap, accomplished by the gating of device 28 represented by waveform 429. Therefore, it will be seen that the regulator maintains complete control with resistive loads, using the guard band periods to initiate the S+ signals which prevent the regulator from freezing on the higher voltage tap. Also, the guard bands provide sufficient time to switch from the higher voltage tap to the lower voltage tap, via devices poled in the same direction, so that at current reversal, devices of a specific tap are switched, instead of switching the current between taps.

Figure 5:
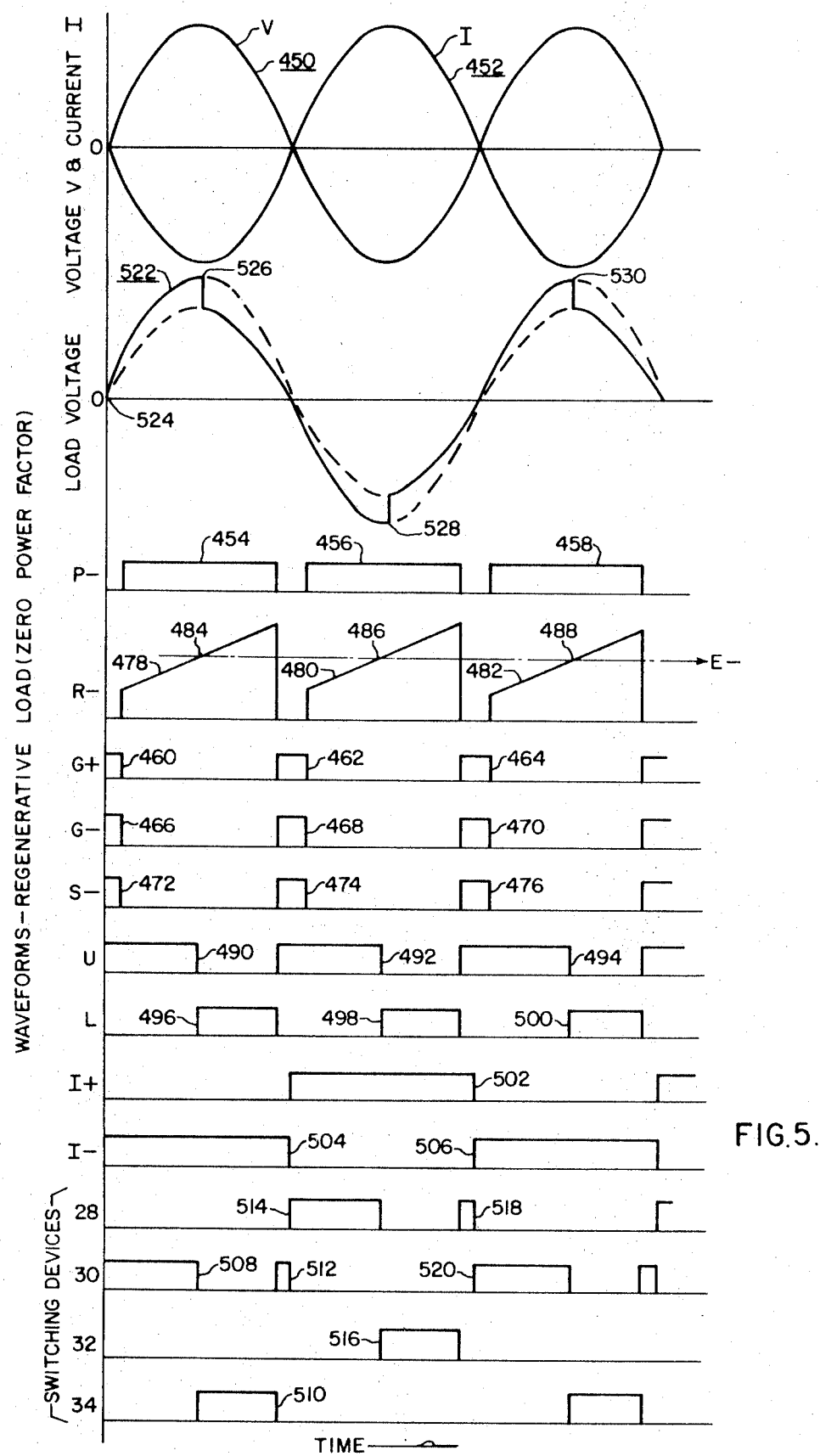
FIG. 5 is a set of waveforms which illustrates the operation of the regulator apparatus shown in FIG. 1 with a regenerative load.

FIG. 5 illustrates circuit waveforms which are explanatory of the operation of regulator apparatus 10 show in FIG. 1 for a regenerative load. The source voltage is represented by waveform 450, and the load current, which is 180° out of phase with the source voltage, is represented by waveform 452. With a regenerative load, the power flow is negative, providing P− signals 454, 456 and 458, which generate R− signals 478, 480 and 482, respectively. The G+ signals generated in the guard bands at current zero are represented by waveforms 460, 462 and 464, and the G− signals generated in the guard bands at the voltage zero crossings are represented by waveforms 466, 468 and 470. Since the G+ and G− signals are coincident with a regenerative load, S− signals 472, 474 and 476 are generated at the coincident locations. With a regenerative load, the load voltage, represented by waveform 522 starts from current zero at point 524 on the higher voltage tap and switches to the lower voltage tap at point 526 when the E− signal crosses the R− signal 478 at point 484. The U signal 490 is terminated at this point, and the L signal 496 is initiated, and since the I− waveform 504 is present at this time, device 34 of the lower tap is gated, indicated by waveform 510, and device 30 of the upper tap, represented by waveform 508 is commutated to its nonconductive state. As current reversal is approached, the S− signal terminates the L signal 496 and initiates the U signal 492, gating device 30, represented by waveform 512, during current reversal and immediately gating device 28 of the same tap, represented by waveform 514, to start the next load voltage half cycle on the upper tap. The load voltage operates on the upper tap until reaching point 528, which is the E− crossing of the R− signal 480 at point 486, terminating the U signal 492 and initiating the L signal 498. Since the I+ signal 502 is present at this time, device 32 is gated, represented by waveform 516, commutating device 28, represented by waveform 514, to its nonconductive state. At current reversal the S− signal 476 terminates the L signal 498 and initiates the U signal 494, gating device 28, represented by waveform 518, during current reversal, and immediately gating device 30 of the same tap, represented by waveform 520.

Thus, the regulator apparatus 10 remains in complete control for a regenerative load, using the S− signals generated by the coincident guard bands to prevent the regulator from freezing on the lower tap, switching back to the higher voltage tap at the voltage and current zero points, switching taps by gating a device of the higher voltage tap which is poled in the same direction as the conductive device of the lower voltage tap, and then immediately gating the other device of the higher voltage tap as the current zero point is passed.

The control circuitry 13 of regulator apparatus 10 lends itself to the use of logic circuitry. The power flow indicator 70 may process the signals from the current and voltage zero crossing detectors 40 and 56 in logic circuitry, with signal P+ being a logic one during positive power flow conditions, and otherwise a logic zero, and signal P− being a logic one during negative power flow conditions and otherwise a logic zero. Similarly, signals I+ and I− would be a logic one during the positive and negative alternations, respectively, of the load current. Signals G+ and G− would be logic one at the current and voltage zero crossing points, respectively, and otherwise logic zero. Signals S+ and S− would be logic one when signals G+ and G− coincide, for resistive and regenerative loads, respectively, and otherwise logic zero. Signals U and L would be logic one when the tap changer may operate on the upper and lower taps, respectively and otherwise logic zero. The firing means 152 may be a logic circuit which selects the proper device to be gated in response to the logic signals I+, I−, U and L.

Figure 6:
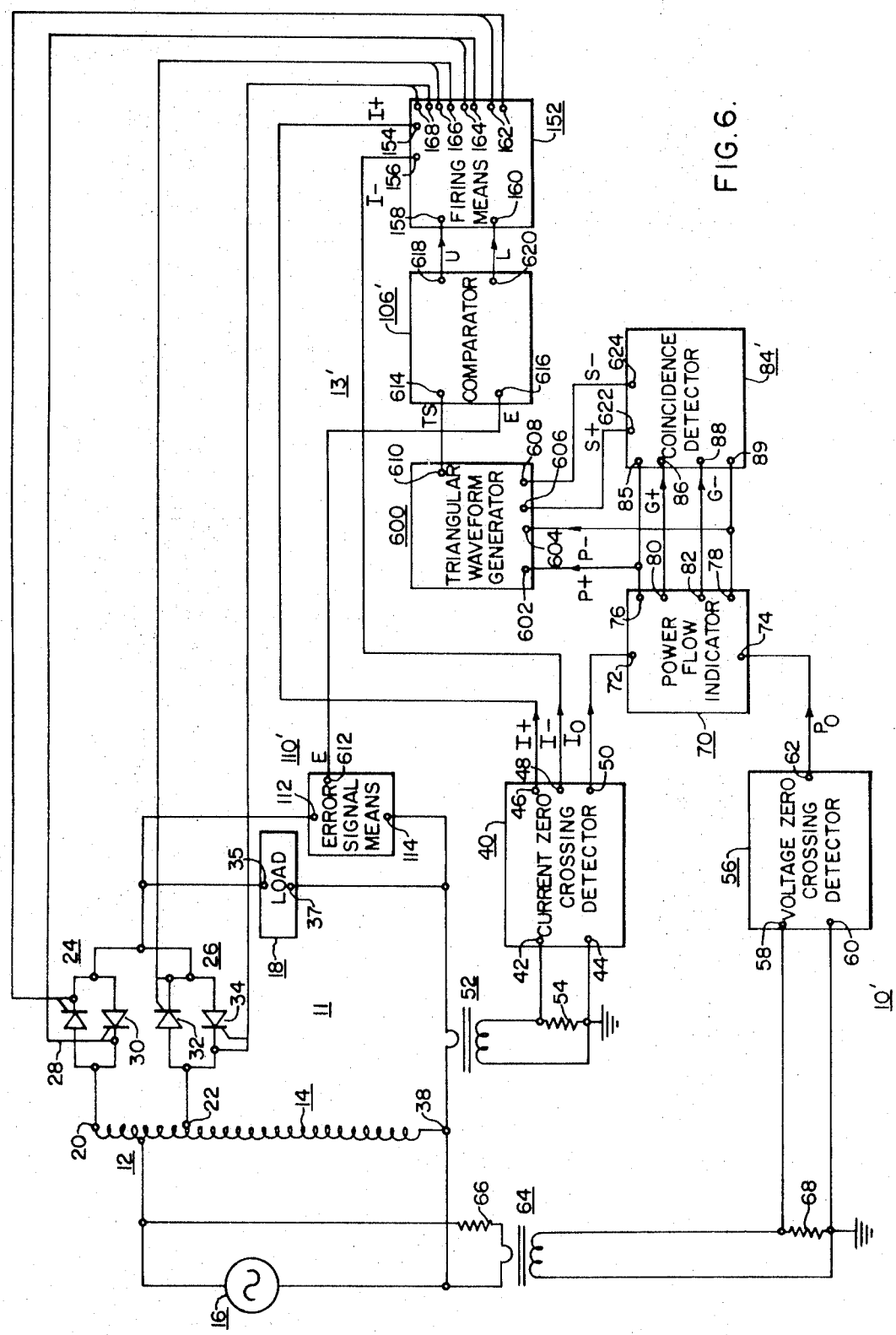
FIG. 6 is a block diagram of regulator apparatus constructed according to the teachings of another embodiment of the invention.

In certain applications it would be desirable to provide control circuitry for the basic power circuit 11 which is DC coupled throughout. Complete DC coupling of the functions would provide a circuit which has a higher noise immunity than control circuit 13 shown in FIG. 1, which utilizes the flip-flop memory element 134. FIG. 6 is a block diagram of regulator apparatus 10′ which utilizes the same basic power circuit 11 as the block diagram of FIG. 1, but which includes control apparatus 13′ which provides the same results as control circuit 13 of FIG. 1, but modified to use all DC coupled functions. Like reference numerals in FIGS. 1 and 6 indicate like functions or components, while like reference numerals with a prime mark indicate similar but modified functions or components.

More specifically, the current zero crossing detector 40, the voltage zero crossing detector 56, the power flow indicator 70, and the firing means 152 may all function in the manner hereinbefore described. The ramp generators 94 and 96, comparator 108, and flip-flop means 134 have been eliminated, error signal means 110′, comparator 106′ and coincidence detector 84′ have been modified, and a triangular waveform generator 600 has been added to control circuit 13′.

Instead of generating first and second error signals and first and second ramp voltages which are compared therewith, respectively, control circuit 13′ requires that only a single error signal be generated, and triangular waveform generator 600 provides a single, continuous timing signal which has the correct waveform for controlling the operation of the power circuit 11, regardless of the type of connected load.

Triangular waveform generator 600 has input terminals 602, 604, 606 and 608, and an output terminal 610. Signals P+ and P− responsive to positive and negative power flow, respectively, are applied to input terminals 602 and 604 of triangular waveform generator 600 from terminals 76 and 78, respectively, of power flow indicator 70. Triangular waveform generator 600 provides the timing ramps for both positive and negative power flow conditions in one continuous output signal TS, providing a ramp having a positive slope during conditions of positive power flow and a ramp having a negative slope during conditions of negative power flow. The ramp responsive to positive power flow starts at zero or ground potential and increases linearly to a predetermined magnitude, having the slope necessary to reach this predetermined magnitude at the end of the positive power flow, and the ramp responsive to negative power flow starts at the predetermined elevated voltage magnitude and decreases linearly to zero or ground potential, having the slope necessary to reach ground potential at the end of the negative power flow. The finish of one ramp and the start of the next ramp are separated by guard bands, as will be hereinafter explained, to prevent a tap change at current or voltage zero.

Error signal means 110′ provides a single error signal E at an output terminal 612, which signal is compared with the triangular voltage signal TS generated by the triangular waveform generator 600. Error signal E, by design, is limited to predetermined minimum and maximum values, for purposes which will be hereinafter explained. Comparator 106′ has input terminals 614 and 616, and output terminals 618 and 620. Output terminal 610 of triangular waveform generator 600 is connected to input terminal 614 of comparator 106′, and output terminal 612 of error signal means 110′ is connected to input terminals 616 of comparator means 106′. Output terminals 618 and 620 of comparator means 106′ are connected to input terminals 158 and 160, respectively, of firing means 152.

Comparator 106′ compares the error signal E with the triangular timing signal TS, and in response thereto provides an output at either terminal 618 or terminal 620, depending upon the direction of the instantaneous power flow in circuit 11. When a positive slope ramp of signal TS crosses the error signal E, indicating the power flow is positive, a tap change may be initiated in the load voltage increasing direction, and comparator 106′ provides an output signal U at terminal 618. The generation of output signal U is a signal to change to a higher voltage tap. Thus, the initiation of signal U selects the tap which is to have one of its switching devices activated, which tap is the next higher voltage tap compared to the tap on which the tap changer is then operating.

When a negative slope ramp of signal TS crosses the error signal E, indicating the power flow is negative, a tap change may be initiated in the load voltage decreasing direction, and comparator 106′ provides an output signal L at its output terminal 620. The generation of output signal L is a signal to change to a lower voltage tap. Thus, the initiation of signal L selects the tap which is to have one of its switching devices activated, which is the next lower voltage tap adjacent the tap on which the system is then operating.

In the event the positive and negative ramps of signal TS do not intersect the error signal E, it would be desirable, though not absolutely essential, to have the regulator go through the motions of a tap change, even when the manual or feedback control signal calls for continuous upper, or continuous lower tap operation. As hereinbefore stated relative to FIG. 1, this will minimize the desaturation time of the regulator, and make it easier to stabilize closed loop control systems. This result is provided by control 13' by designing the coincidence detector 84' to provide signals S+ and S− even when the signals G+ and G− do not coincide. In this instance, signals S+ and S− may be called first and second load responsive signals instead of first and second coincident signals. For a lagging power factor load, the coincidence detector 84' provides the load responsive signals S+ and S− in response to and coincident with the signals G+ and G−, respectively. For a leading power factor load, the coincidence detector 84' provides the load responsive signals S+ and S− in response to signals G− and G+, respectively. When signal G+ immediately follows signal P−, the coincidence detector 84' determines that the load has a lagging power factor, and when the signal G+ immediately follows signal P+, the coincident detector determines that the load has a leading power factor. Thus, signals S+ and S− are generated in the guard bands, and these signals provide end stops at the ends of the negative and positive ramps, respectively. The end stops responsive to signal S+ reduce the magnitude of the signal TS at the end of a negative ramp, below the minimum magnitude selected for the error signal E, which therefore initiates a tap change at the start of the guard band, when the error signal E is at its minimum magnitude, and then switches right back to the previous tap at the end of the guard band. The end stop responsive to signal S− increases the magnitude of signal TS at the end of the positive ramp, above maximum magnitude of error signal E, which if error signal E is at its maximum magnitude, switches taps at the end of the positive ramp, or the start of the guard band, and then right back to the same tap again at the end of the guard band, at the start of the negative ramp. In other words, when the error signal E is at its minimum magnitude, the load responsive signal S+ causes comparator means 106' to initiate signal U at the end of the negative ramp or start of the guard band, and to initiate signal L at the start of the positive ramp, or end of the guard band. When the error signal E is too large to intersect the ramps, signal S− causes comparator means 106' to initiate signal L at the end of the positive ramp, or start of the guard band, and to initiate signal U at the start of the negative ramp, or end of the guard band. Therefore, while a tap change is made, it remains on the newly selected tap for only the duration of the guard band.

Firing means 152 provides firing signals for the appropriate controlled rectifier device, in response to signals U, L, I+ and I−, as hereinbefore described relative to FIG. 1. Since comparator 106' can only change its output during or at the end of a ramp, and since the ramps are responsive to the signals P+ and P−, tap changes cannot occur during the guard bands when tap-to-tap short circuits could occur. Thus, the proper switching device of a proper tap is automatically selected by control circuit 13', regardless of the load power factor, and complete control is maintained throughout each half cycle, except for the very short periods of the guard bands. When the load current passes through current zero while the apt changer apparatus is operating on a predetermined tap, the proper device of that tap is automatically gated by the control apparatus as the current reversal is made, to continue operating on the desired tap.

When the load circuit approaches the purely resistive state, only the lower end stops are required, and when the load circuit approaches the purely regenerative state, only the upper end stops are required. This function is also provided by the coincidence detector 84'. When the load becomes purely resistive, signals G+ and G− coincide, and instead of the coincidence detector providing both signals S+ and S−, signal S− is suppressed and only signal S+ is generated. When signal S+ is generated, it switches the operating state of comparator 106' by pulling the output signal TS from its maximum to its minimum magnitude, crossing the error signal E and causing the comparator 106' to generate signal L and switch to the lower voltage tap at the voltage zero crossings. When the load becomes purely regenerative, signals G+ and G− also coincide, and only signal S− is generated, with signal S+ being suppressed by the coincidence detector 84'. Signal S− is applied to input terminal 608 of triangular waveform generator 600. When signal S− is generated, it switches the operating state of comparator 106' by increasing the output voltage TS to its maximum magnitude, thus crossing the error signal E, causing comparator 106 to generate signal U and switch to a higher voltage tap at the voltage zero crossings.

Figure 7:
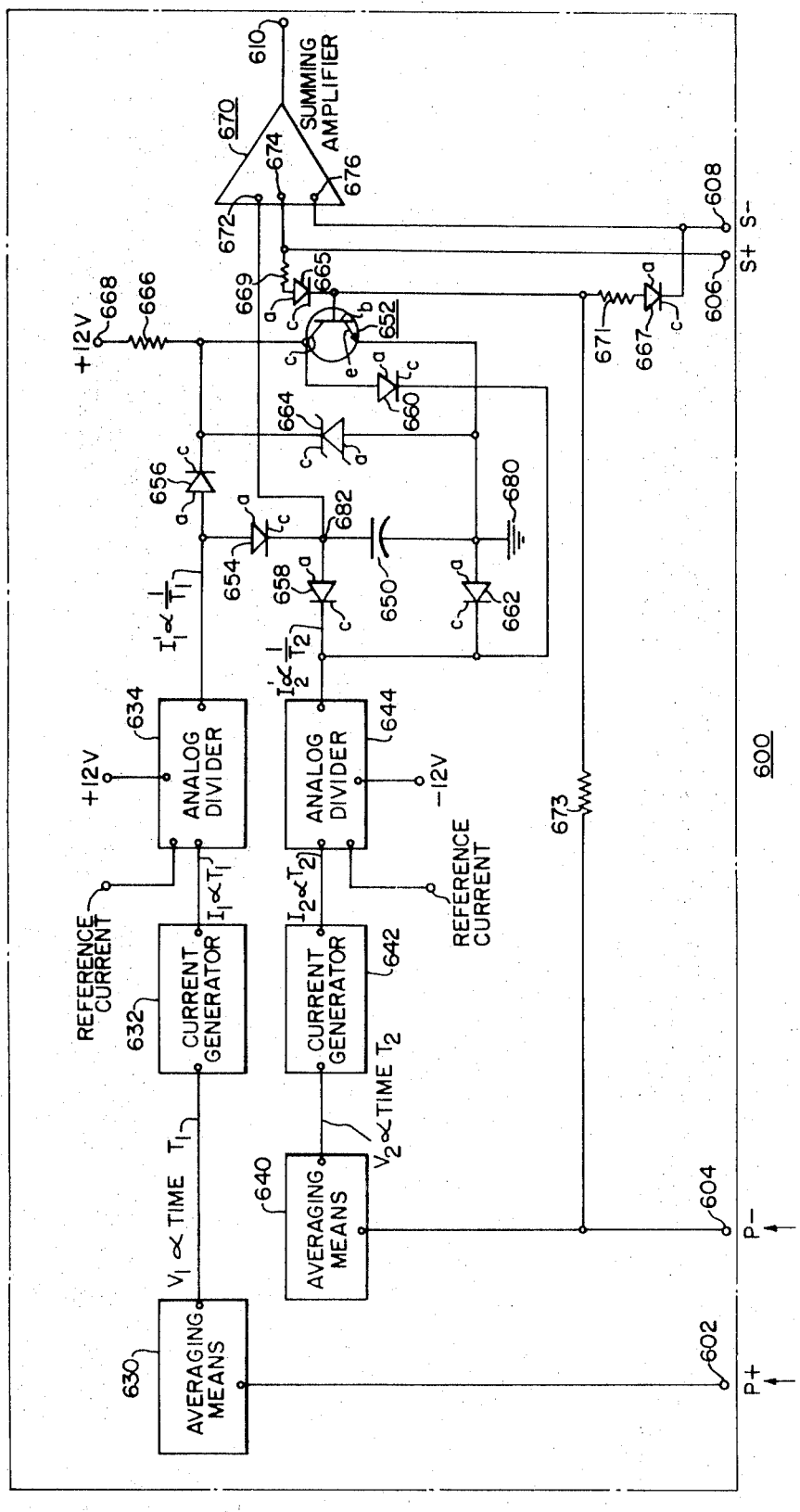
FIG. 7 is a partially schematic and partially block diagram of a triangular waveform generator which may be used in the regulator apparatus shown in FIG. 6.

FIG. 7 is a partially schematic, partially block diagram of a triangular waveform generator which may be used for the triangular waveform generator 600 6, in FIG. 6, but any suitable triangular waveform generator which provides the required functions may be used. In the specific arrangement shown in FIG. 7, first and second DC current signals $I_1'$ and $I_2'$ are generated which are responsive to the time that the power flow is positive and negative, respectively, in power circuit 11, and these current signals are used to control the charging and discharging of a capacitor 650. The voltage across the capacitor 650 is applied to a summing amplifier 670, to which the signals S+ and S− are applied to incorporate the end stops into the timing waveform.

More specifically, input terminal 602, which receives signal P+, is connected to averaging means 630 providing a voltage signal $V_1$ which is proportional to the time $T_1$ in each half cycle of the source voltage that the power flow is positive. The voltage signal $V_1$ is applied to a current generator 632, which provides a DC current $I_1$ responsive to $V_1$, and thus to time $T_1$. Current signal $I_1$ is compared with a constant reference current in analog divider 634, providing the current signal $I_1'$ which is proportional to $1/T_1$.

In like manner, input terminal 604, which receives signal P−, is connected to averaging means 640, which provides a voltage signal $V_2$ proportional to the time $T_2$ in each half cycle of the source voltage that the power flow is negative. The voltage signal $V_2$ is applied to a current generator 642, which provides a DC current $I_2$ responsive to the voltage signal $V_2$, and thus to time $T_2$. Current signal $I_2$ is compared with a constant reference current in analog divider 644, providing the current signal $I_2'$ which is proportional to $1/T_2$.

Current signals $I_1'$ and $I_2'$ are applied to charge and discharge capacitor 650, as controlled by a solid-state switch, such as an NPN-junction transistor 652 having base, collector and emitter electrodes $b$, $c$ and $e$, respectively, and by a plurality of diodes, such as diodes 654, 656, 658, 660 and 662, and a Zener diode 664, all of which have cathode and anode electrodes $c$ and $a$, respectively.

Capacitor 650 is connected between the output of analog divider 634 and ground 680 via diode 654, and from ground 680 to the output of analog divider 644 via diode 658. Diode 654 is poled to control the charging of capacitor 650 by the current signal $I_1'$, and diode 658 is poled to control the discharging of capacitor 650 by the current signal $I_2'$. The emitter electrode $e$ of transistors 652 is connected to ground 680, its base electrode $b$ is connected to the input terminals 604 and 606, and is thus responsive to signals P− and S+, and its collector electrode $c$ is connected to the output of analog divider 634 via diode 656, and to terminal 668 via resistor 666. Diode 656 is poled to divert the current signal $I_1'$ through the collector-emitter junction of transistor 652 to ground 680, when transistor 652 is conductive, and terminal 668 is adapted for connection to a DC supply potential. Diode 662 is connected from ground 680 to the output of analog divider 644, and is poled to prevent capacitor 650 from discharging below ground potential, and diode 660 is connected from the collector electrode $c$ of transistor 652 to the output of analog divider 644, and is poled to conduct current from the supply terminal 668 to the output of analog divider 644. Zener diode 664 is connected across the collector-emitter electrodes of transistor 652, which regulates the voltage across capacitor 650 through the diode 654. The voltage across capacitor 650 is the output voltage, with terminal 682 at junction of capacitor 650 and diodes 654 and 658 being connected to terminal 672 of summing amplifier 670. Input terminals 606 and 608 of triangular waveform generator 600 are connected to input terminals 674 and 676 of summing amplifier 670. The output of summing amplifier 670 is connected to output terminal 610 of the triangular waveform generator 600.

When the power flow in the power circuit 11 is positive, and signal P− is not present, or is a logical "zero" if logic circuitry is used, transistor 652 will be nonconductive and signal $I_1'$ will control the charging of capacitor 659 via diode 654. Diode 656 is back biased and current signal $I_2'$ is supplied from the supply terminal 668 via diode 660.

When the power flow switches negative and signal P− appears, or switches to a logical "one," transistor 652 is switched to its conductive state and signal $I_1'$ is shunted to ground 680 via transistor 652. Current controlled by signal $I_2'$ flows out of capacitor 650 via diode 658. In this instance, diode 669 is back biased.

Should the voltage on capacitor 650 attempt to rise above the reverse breakdown voltage of Zener 664, Zener 664 will become conductive in its reverse direction, shunting current signal $I_1'$ to ground, thus regulating the voltage on capacitor 650 to a a predetermined maximum.

Summing amplifier 670 provides the end stops in the timing ramps of triangular waveform generator signal TS, by adding signals S− to the waveform and subtracting signals S+.

Resetting capacitor 650 at the end of each voltage half cycle for resistive and regenerative loads may be accomplished in many different ways. For example, as shown in FIG. 7 diodes 665 and 667 are connected between the base electrode b of transistor 652 and input terminals 606 and 608, respectively, via resistors 669 and 671, respectively, a resistor 673 is connected between terminal 604 and the base electrode b of transistor 652, and the signal S− applied to terminal 608 is made negative with respect to ground. Diode 665 is poled to conduct current to the base electrode b, and diode 667 is poled to conduct current away from the base electrode b. Resistors 669, 671 and 673 are selected so the S+ and S− signals dominate the P− signal when they occur, as far as the transistor 652 is concerned.

The operation of regulator apparatus 10' may be better understood by considering the four types of loads, i.e., lagging, leading, resistive, and regenerative, separately, with FIGS. 8, 9, 10 and 11 illustrating sets of circuit waveforms for these loads, respectively. FIGS. 8, 9, 10 and 11 are similar to FIGS. 2, 3, 4 and 5, respectively, with like reference numerals indicating like waveforms.

Figure 8:
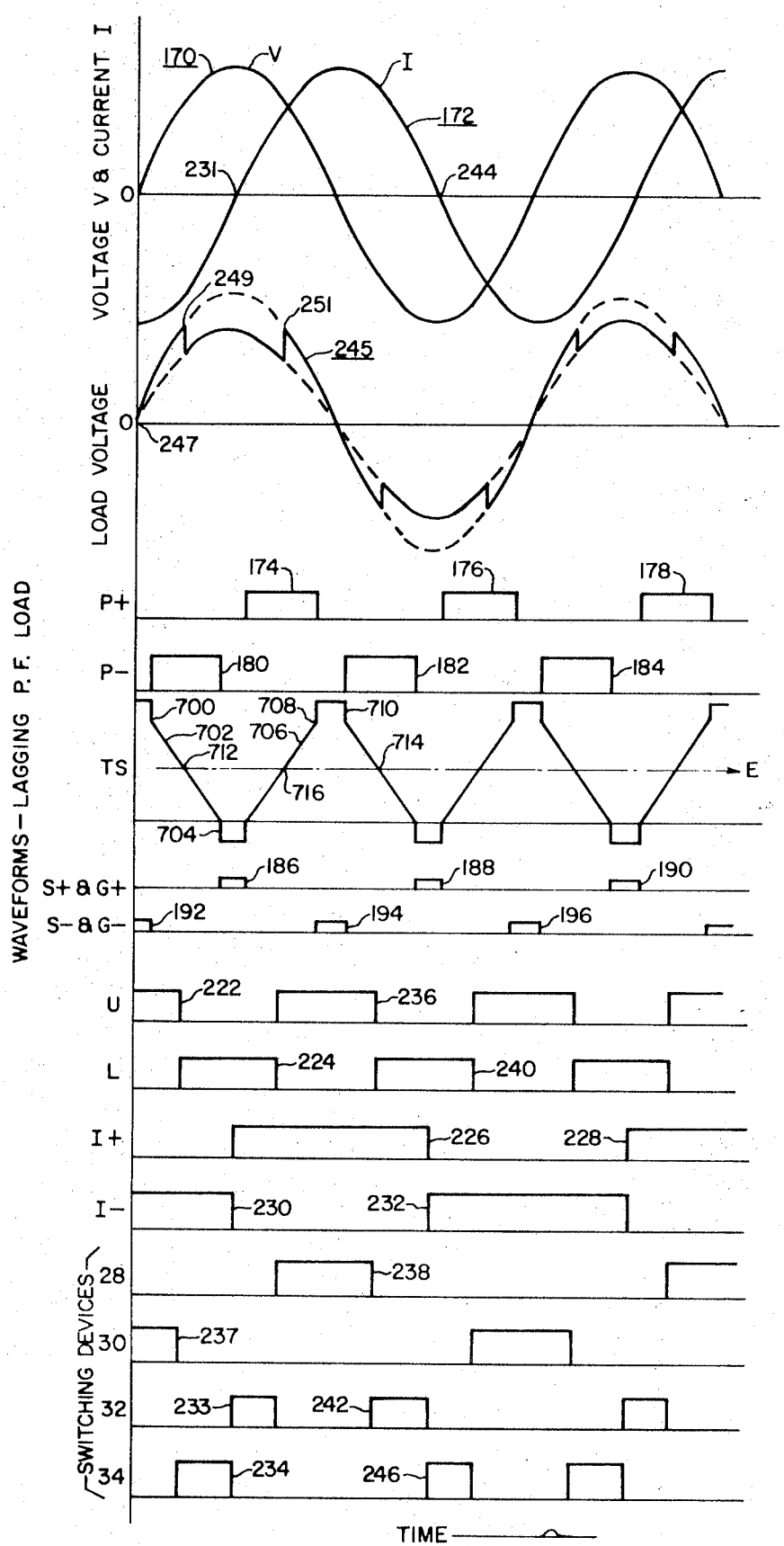
FIG. 8 is a set of waveforms which illustrate the operation of the regulator apparatus shown in FIG. 6 with an inductive load.

FIG. 8 Illustrates the circuit waveforms which are explanatory of the operation of regulator apparatus 10' shown in FIG. 6 for a lagging load. Signal TS starts at a predetermined maximum magnitude 700 at the start of the P− signal waveform 180 and decreases linearly along ramp 702, until reaching zero or ground potential at the termination of signal P−. An end stop 704 is provided by signal S+ indicated by waveform 186, which drops the magnitude of signal TS below the minimum magnitude of the error signal E. At the end of signal S+ and the start of signal P+, signal TS increases linearly from ground along ramp 706, reaching the desired predetermined magnitude 708 at the end of the P+ signal, at which point end stop 710 is provided in response to signal S−, which increases the magnitude of signal TS above the maximum magnitude of the error signal E. Signal TS then repeats this cycle.

Comparator 106' compares signal TS and error signal E, initiating signal L when error signal E crosses the ramp having a negative slope, and initiating signal U when the error signal E crosses the ramp with the positive slope. Thus, crossing points 712 and 714 on waveform TS initiate the L signal waveforms 224 and 240, respectively, and crossing point 716 on signal TS initiates the U signal waveform 236. If the error signal E should increase above the maximum ramp magnitude, it would intersect the upper end stops, switching taps at both sides of an end stop. If the error signal should decrease below the minimum magnitude of the ramp voltages, taps would be switched at both sides of each of the lower end stops.

Figure 9:
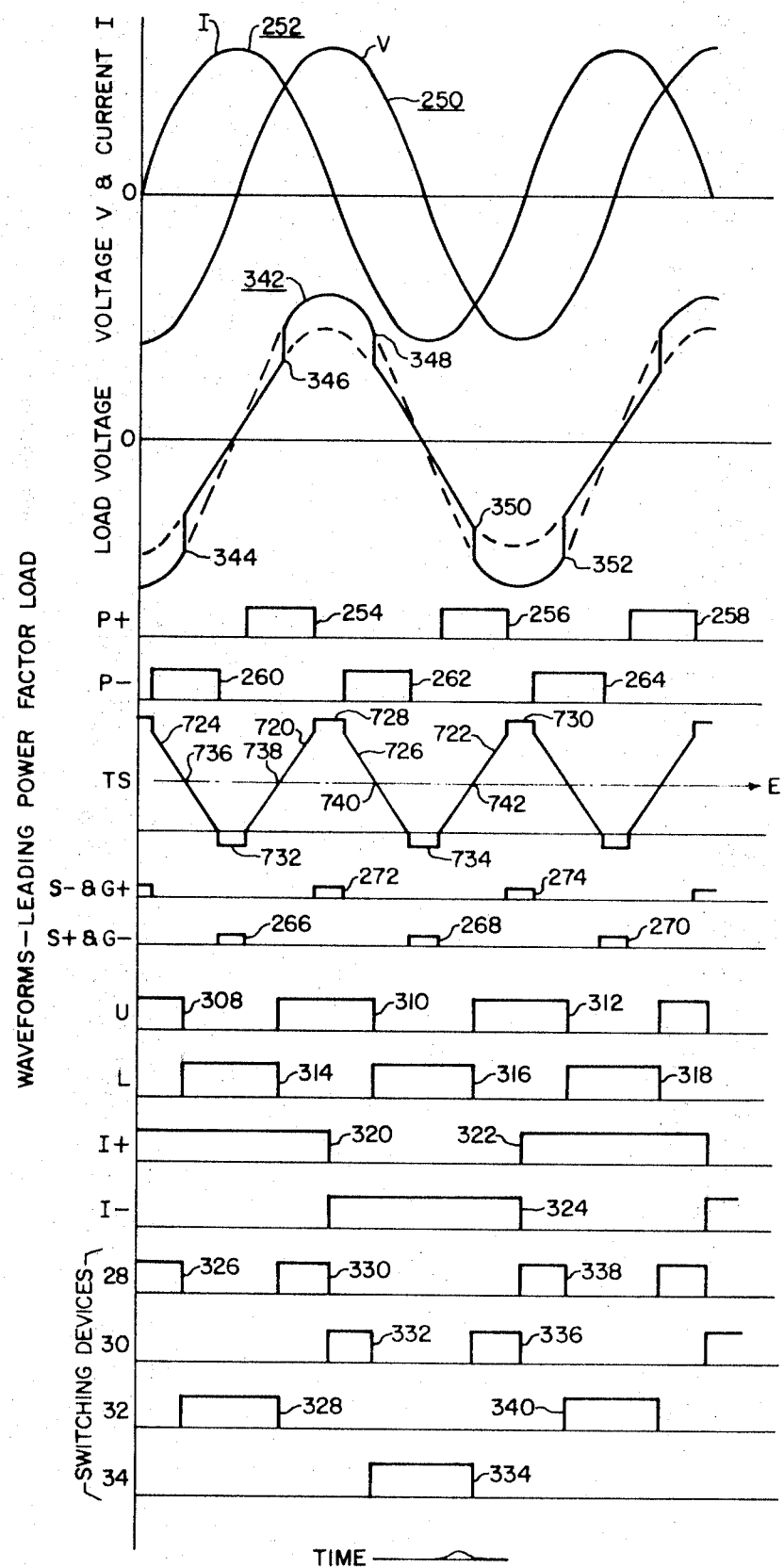
FIG. 9 is set of waveforms which illustrates the operation of the regulator apparatus shown in FIG. 6 with a capacitive load.

FIG. 9 illustrates circuit waveforms explanatory of the operation of regulator apparatus 10' for a leading power factor load. The waveform of signal TS is similar in shape to that of the lagging power factor load, but is shifted in phase in order to switch from the lower to the upper, and from the upper to the lower tap, during a voltage half cycle, instead of switching from the upper to the lower, and then back to the upper tap, during a voltage half cycle. Signal TS has positive slope ramps 720 and 722 responsive to P+ signal waveforms 254 and 256, respectively, and negative slope ramps 724 and 726 responsive to the P− signals 260 and 262, respectively. The positive and negative ramp signals are separated by end stops 728 and 730 at the upper magnitude of signal TS, and by end stops 732 and 734 at the minimum magnitude of signal TS. Since signal G+ now follows signal P+ in time, the coincidence detector 84' synchronizes signals S− and G+, and S+ and G−, in order to properly form the end stops. The error signal E crosses ramps 724, 720, 726 and 722 at points 736, 738 740 and 742, respectively, initiating the L signal waveforms 314 and 316 at crossing points 736 and 740, and the U signal waveforms 310 and 312 at the crossing points 738 and 742.

Figure 10:
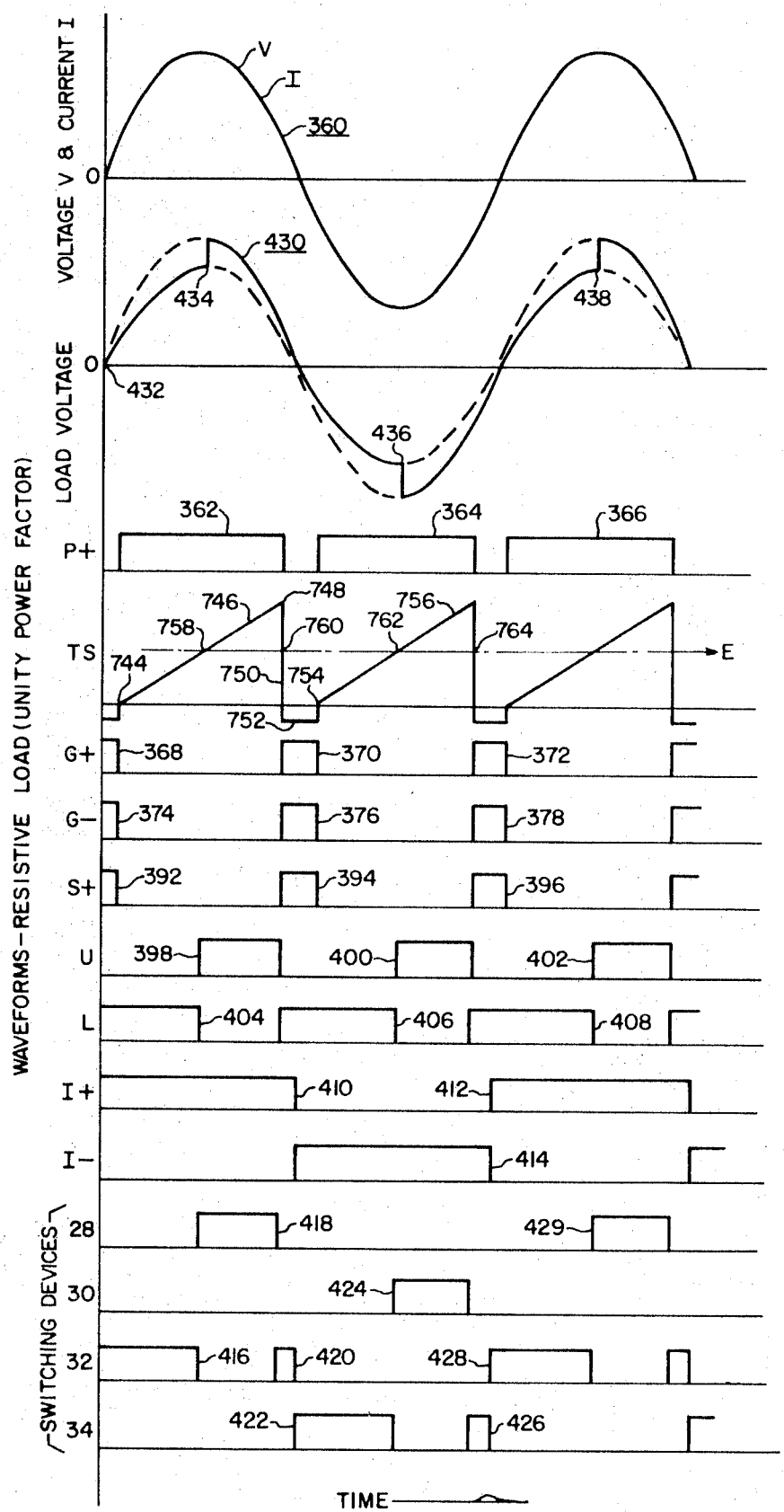
FIG. 10 is a set of waveforms which illustrates the operation of the regulator apparatus shown in FIG. 6 with a resistive load.

FIG. 10 illustrates circuit waveforms explanatory of the operation of regulator apparatus 10 for a resistive or unity power factor load. In this instance, signal TS has all positive ramps separated by end stops, since signal P− will not be generated. Signal TS starts at ground potential at point 744 simultaneously with the initiation of the P+ signal 362, and increases linearly along ramp 746, reaching its predetermined magnitude at point 748 at the termination of P+ signal 362. The signal TS is then reset, dropping along vertical line 750 to end stop 752, which is generated in response to the S+ signal 394, and the next ramp starts at point 754 and increases linearly along ramp 756. The error signal E crosses signal TS at points 758 and 762 on ramps 746 and 756, respectively, and also when the waveform resets, at points 760 and 764. When the error signal E crosses the ramp voltages, U signals are initiated, and when the ramp resets, the L signal is generated, with the resetting of the TS signal preventing freezing on the upper tap.

Figure 11:
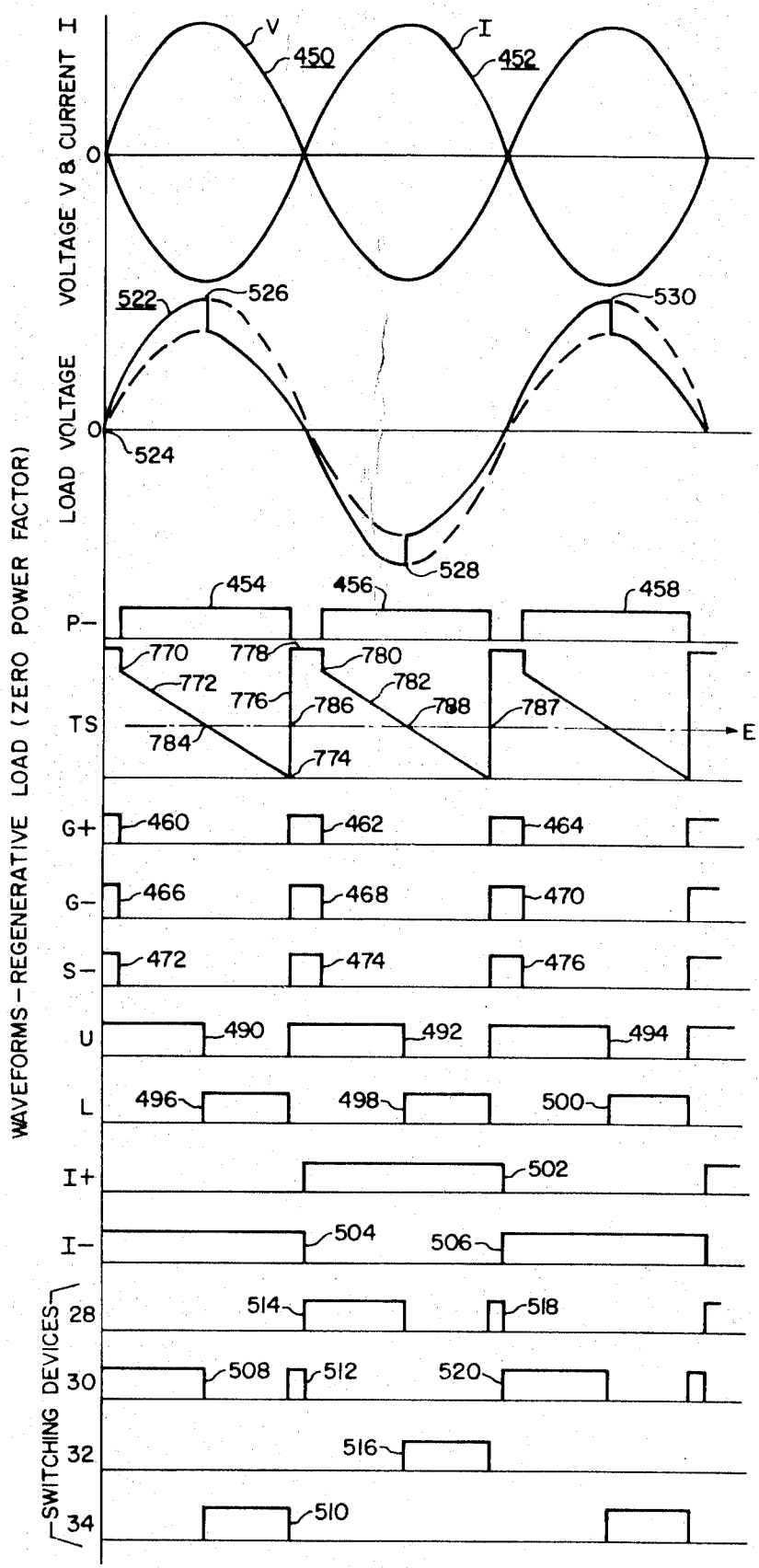
FIG. 11 is a set of waveforms which illustrates the operation of the regulator apparatus shown in FIG. 6 with a regenerative load.

FIG. 11 illustrates circuit waveforms explanatory of the operation of regulator apparatus 10' for a regenerative load. In this instance, signal TS has only negative slope ramps, as the P+ signal is not generated. Signal TS starts at point 770, simultaneously with the initiation of signal P− waveform 454, and decreases linearly along ramp 772 until reaching ground potential at point 774, simultaneously with the termination of the P− signal waveform 454. Upon reaching ground potential at point 774, the TS waveform is reset, rising substantially vertically along line 776, and entering the end stop 778 provided by signal S−. At the end of the end stop 778, the ramp starts at point 780 and linearly decreases along line 782, starting and terminating with the initiation and termination, respectively, of the P− waveform 456. The error signal E crosses the waveform TS at the ramps, and also when the ramps are being reset, with the crossing of the ramps at point 784 and initiating 788 the L signals 496 and 498, respectively, and with the resetting crossing the error signal E at points 786 and 787 initiating the U signals 492 and 494. Resetting of the TS signal prevents freezing on the lower tap.

In summary, there has been disclosed new and improved regulator or control apparatus of the solid-state tap changing type, which provides complete control for any type of load, thus making the regulator apparatus suitable for use in electrical power systems. Taps are changed only by gating a device which is poled similar to the conductive device. At current reversal, the devices of the operating tap are switched. Guard bands prevent tap changes where tap-to-tap short circuits may occur, and these guard bands also provide the function of determining when the load is purely resistive or purely regenerative, providing signals which enable the regulator apparatus to remain in control during these load conditions, by providing auxiliary switching signals which prevent the regulator from freezing on a lower or an upper tap. The regulator apparatus also includes means for forcing the regulator to go through the motions of a tap change, even when the error signals demand all upper or all lower tap operation, which feature minimizes the desaturation time of the regulator, and makes it easier to stabilize the regulator in closed loop feedback control systems.

I claim as my invention:

1. Solid-state tap changer apparatus, comprising:
   a power circuit including a source of alternating potential, a transformer including a winding having at least first and second taps, and a load circuit,
   each of said taps including first and second solid-state switching means disposed to control the effective connection of the taps into said power circuit,
   first means providing control signals which indicate when a tap change is required,
   second means providing signals responsive to the direction of instantaneous power flow in said power circuit,
   third means providing signals responsive to the direction of instantaneous current flow in said power circuit, and
   fourth means providing gating signals for said solid-state switching means in response to the signals from said first, second and third means, said fourth means allowing a tap change to increase the load voltage only when the power flow is towards the load circuit, and allowing a tap change to decrease the load voltage only when the power flow is towards the source.

2. The solid-state tap changer apparatus of claim 1 including means providing signals when the load circuit is purely resistive and purely regenerative, said means being connected to the fourth means and initiating tap changes in a predetermined direction, with the direction being dependent upon the type of load.

3. The solid-state tap changer apparatus of claim 1 including means which prevents tap changes from being attempted at the source voltage and load current zero crossings.

4. Solid-state tap changer apparatus, comprising:
   a power circuit including a source of alternating potential, a transformer including a winding having at least first and second taps, and a load circuit,
   each of said taps including first and second solid-state switching means disposed to control the effective connection of the taps into said power circuit,
   first means providing control signals,
   second means providing signals responsive to the direction of instantaneous power flow in said power circuit,
   third means providing signals responsive to the direction of instantaneous current flow in said power circuit,
   fourth means providing gating signals for said solid-state switching means in response to the signals from said first, second and third means, said first means controlling when a tap change is to be made, said second means controlling the direction of the tap change and the selected tap, and said third means controlling which solid-state switching means of the selected tap is gated, and
   means for switching taps at a predetermined time, when the control signal provided by the first means does not demand a tap change, with the tap change being of short duration, to reduce the desaturation time of the solid-state switching device.

5. Solid-state tap changer apparatus, comprising:
   a power circuit including a source of alternating potential, a transformer including a winging having at least first and second taps, and a load circuit,
   each of said taps including first and second solid-state switching means disposed to control the effective connection of the taps into said power circuit,
   first means providing first and second error signals, second means providing first and second power flow signals responsive to positive and negative power flow, respectively, third means providing signals responsive to the direction of instantaneous current flow in said power circuit, fourth means including first and second ramp generators, first and second comparator means, flip-flop means, and firing means, said first and second ramp generators providing first and second ramp voltages, respectively, in response to said first and second power flow signals, respectively, said first comparator means being responsive to said first error signal and said first ramp voltage, providing a first trigger signal when said first ramp voltage reaches the magnitude of said first error signal, said second comparator means being responsive to said second error signal and said second ramp voltage, providing a second trigger signal when said second ramp voltage reaches the magnitude of said second error signal, said flip-flop means changing its operating state in response to said first and second trigger signals, said firing means providing gating signals in response to said flip-flop means and the signals provided by said third means.

6. The solid-state tap changer apparatus of claim 5 wherein the flip-flop means is responsive to the first and second power flow signals, changing its operating state at the end of the first power flow signal when the first ramp voltage fails to reach the magnitude of the first error signal, and changing its operating state at the end of the second power flow signal when the second ramp voltage fails to reach the magnitude of the second error signal.

7. The solid-state tap changer apparatus of claim 5 including means providing first and second zero crossing signals at the load current zero crossings and at the source potential zero crossings, respectively, and means responsive to said first and second zero crossing signals providing first and second load responsive signals when said first and second zero crossing signals coincide due to resistive and regenerative loads, respectively; the flip-flop means being responsive to said first and second load responsive signals when they occur, switching its operating state in response thereto.

8. Solid-state tap changer apparatus, comprising:
   a power circuit including a source of alternating potential, a transformer including a winding having at least first and second taps, and a load circuit,
   each of said taps including first and second solid-state switching means disposed to control the effective connection of the taps into said power circuit,
   first means providing an error signal,
   second means providing signals responsive to the direction of instantaneous power flow in said power circuit,
   third means providing signals responsive to the direction of instantaneous current flow in said power circuit,
   fourth means including a triangular waveform generator, comparator means, and firing means, said triangular waveform generator providing triangular output signals in response to said second means, with the triangular output signals having a positive slope ramp during positive power flow and a negative slope ramp during negative power flow, said comparator means being responsive to said error signal and said triangular output signal, providing signals each time the triangular output signal is the same magnitude as the error signal, said firing means providing gating signals in response to the signals from said comparator means and said third means.

9. The solid-state tap changer apparatus of claim 8 wherein the error signal provided by the first means has predetermined minimum and maximum magnitudes, and including means which drops the magnitude of the triangular output signal below the minimum error signal magnitude at the transition from negative to positive slope ramps, and which increases the magnitude of the triangular output signal above the maximum error signal magnitude at the transition from positive to negative slope ramps.

10. The solid-state tap changer apparatus of claim 8 wherein the error signal provided by the first means has predetermined minimum and maximum magnitudes, and wherein the fourth means also includes means providing first and second crossing signals at the load current zero crossings and at the source potential zero crossings, respectively, and coincidence detector means responsive to said first and second zero crossing signals providing first and second load responsive signals when said first and second zero crossing signals coincide due to resistive and regenerative loads, respectively, said triangular waveform generator being responsive to said first and second load responsive signals, reducing the magnitude of the triangular output signal below the minimum magnitude of the error signal in response to the first load responsive signal, and increasing magnitude of the triangular output signal above the maximum magnitude of the error signal in response to the second load responsive signal.

11. The solid-state tap changer apparatus of claim 10 wherein the coincidence detector means provides both the first and second load responsive signals when the first and second zero crossing signals are not coincident, with the first and second load responsive signals being initiated simultaneously with the first and second zero crossing signals, respectively, for one type of reactive load, and with the first and second load responsive signals being initiated simultaneously with the second and first zero crossing signals, respectively, for the other type of reactive load.

12. Regulator apparatus comprising:
a source of alternating potential,
a load circuit,
transformer means connected between said source of alternating potential and said load circuit through at least first and second bilateral AC switching means, said first bilateral AC switching means including first and second controlled rectifiers connected in inverse parallel between a first tap on said transformer means and said load circuit, and said second bilateral AC switching means including third and fourth controlled rectifiers connected in inverse parallel between a second tap on said transformer means and said load circuit, said second tap providing a lower voltage than said first tap, said first and third controlled rectifiers being poled to conduct current from said source of alternating potential to the load circuit, and said second and fourth controlled rectifiers being poled to conduct current from the load circuit to the source of alternating potential,
first means responsive to said source of alternating potential and the current flowing through said load circuit, providing first and second power flow signals when the instantaneous power flow is toward the load, and when the instantaneous power flow is toward the source of alternating potential, respectively, with the first and second power flow signals being spaced in time,
second means providing first and second ramp voltages in response to said first and second power flow signals, respectively,
third means providing first and second error signals in response to a predetermined quantity to be regulated, said first and second error signals having an equal magnitude when they are equal to the midpoint of the ramp voltage range, with said first and second error signals changing magnitude in opposite directions as the quantity to be regulated demands,
fourth means comparing said first ramp voltage signal and said first error signal and providing a first trigger signal when the first ramp voltage signal reaches the magnitude of the first error signal,
fifth means comparing said second ramp voltage signal and said second error signal and providing a second trigger signal when the second ramp voltage signal reaches the magnitude of the second error signal,
sixth means responsive to the first and second trigger signals, providing a first tap change signal when a tap change to a higher voltage tap may be made and a second tap change signal when a tap change to a lower voltage tap may be made,
seventh means responsive to the current flowing through said load circuit, providing first and second current signals when the load current is positive and negative, respectively, and
eighth means responsive to said first and second tap change signals and to said first and second current signals, providing gating signals for the first controlled rectifier when the first tap change and first current signals coexist, for the second controlled rectifier when the first tap change and second current signals coexist, for the third controlled rectifier when the second tap change and first current signals coexist, and for the fourth controlled rectifier when the second tap change and second current signals coexist.

13. The regulator apparatus of claim 12 wherein the sixth means is responsive to the first means, switching its output from the second to the first tap change signal at the end of the second power flow signal when the second ramp voltage signal fails to reach the magnitude of the second error signal, and switching its output from the first to the second tap change signal at the end of the first power flow signal when the first ramp voltage signal fails to reach the magnitude of the first error signal.

14. The regulator apparatus of claim 12 including ninth means providing first and second zero crossing signals at the load current zero crossings and at the source potential zero crossings, respectively, and tenth means responsive to said first and second zero crossing signals providing a first coincident signal when first and second zero crossing signals coincide due to a resistive load, and a second coincident signal when they coincide due to a regenerative load, the sixth means being responsive to said first and second coincident signals when they occur, switching its output from the first to the second tap change signal in response to said first coincident signal, and from the second to the first tap change signal in response to said second coincident signal.

15. Regulator apparatus comprising:
a source of alternating potential,
a load circuit,
transformer means connected between said source of alternating potential and said load circuit through at least first and second bilateral AC switching means, said first bilateral AC switching means including first and second controlled rectifiers connected in inverse parallel between a first tap on said transformer means and said load circuit, and said second bilateral AC switching means including third and fourth controlled rectifiers connected in inverse parallel between a second tap on said transformer means and said load circuit, said second tap providing a lower voltage than said first tap, said first and third controlled rectifiers being poled to conduct current from said source of alternating potential to the load circuit, and said second and fourth controlled rectifiers being poled to conduct current from the load circuit to the source of alternating potential,
first means responsive to said source of alternating potential and the current flowing through said load circuit, providing first and second power flow signals when the instantaneous power flow is toward the load, and toward the source of alternating potential, respectively, with said first and second power flow signals being spaced in time,
second means providing a triangular voltage signal having positive and negative ramps responsive to said first and second power flow signals, respectively,
third means providing an error signal in response to a predetermined quantity to be regulated,
fourth means comparing said triangular voltage signal and said error signal using the points where said triangular voltage signal crosses said error signal to provide a first tap change signal when a tap change to a higher voltage tap may be made, and a second tap change signal when a tap change to a lower voltage tap may be made,
fifth means responsive to the current flowing through said load circuit, providing first and second current signals when the load current is positive and negative, respectively, and sixth means responsive to said first and second tap change signals and to said first and second current signals, providing gating signals for the first controlled rectifier when the first tap change and first current signals coexist, for the second controlled rectifier when the first tap change and second current signals coexist, for the third controlled rectifier when the second tap change and the first current signals coexist, and for the fourth controlled rectifier when the second tap change and the second current signals coexist.

16. The regulator apparatus of claim 15 wherein the error signal has predetermined minimum and maximum magnitudes, and including seventh means providing first and second zero crossing signals at the load current zero and source potential zero crossings, respectively, and eighth means responsive to said first and second zero crossing signals providing a first coincident signal when said first and second zero crossing signals coincide due to a resistive load, and a second coincident signal when they coincide due to a regenerative load, said second means being responsive to said first and second coincident signals when they occur, reducing the magnitude of the triangular voltage signal below the minimum magnitude of the error signal in response to the first coincident signal, and increasing the magnitude of the error signal in response to the second coincident signal.

17. The regulator apparatus of claim 16 wherein the eighth means generates and applies first and second load responsive signals to the second means in response to the first and second zero crossing signals, respectively, when the first and second zero crossing signals do not coincide, with the first load responsive signal reducing the magnitude of the triangular voltage signal below the minimum magnitude of the error signal, and the second load responsive signal increasing the magnitude of the triangular voltage signal above the maximum magnitude of the error signal.

18. A method of connecting taps on a transformer winding into a power circuit which includes a source of alternating potential and a load circuit, regardless of the power factor of the load circuit, wherein each tap has first and second solid-state switching devices connected in inverse parallel, comprising the steps of:
 determining the direction of instantaneous power flow in the power circuit,
 determining the direction of instantaneous current flow on the power circuit,
 allowing a tap change which increases the load voltage only when the instantaneous direction of power flow is from the source of alternating potential to the load circuit,
 allowing a tap change which reduces the load voltage only when the instantaneous direction of power flow is from the load circuit to the source of alternating potential, and
 gating the device of the selected tap according to the direction of instantaneous current flow.

19. A method of connecting taps on a transformer winding into a power circuit which includes a source of alternating potential and a load circuit, regardless of the power factor of the load circuit, wherein each tap has first and second solid-state switching devices connected in inverse parallel, comprising the steps of:
 determining the direction of instantaneous power flow in the power circuit,
 determining the direction of instantaneous current flow in the power circuit,
 allowing a tap change which increases the load voltage only when the instantaneous direction of power flow is from the source of alternating potential to the load circuit,
 allowing a tap change which reduces the load voltage only when the instantaneous direction of power flow is from the load circuit to the source of alternating potential,
 allowing a device to be switched except for a predetermined period of time adjacent the source voltage and load current zero crossings,
 and gating the device of the selected tap according to the direction of instantaneous current flow.

* * * * *